US012488191B1

(12) United States Patent
Narayan-Chen et al.

(10) Patent No.: US 12,488,191 B1
(45) Date of Patent: Dec. 2, 2025

(54) VIRTUAL ASSISTANT HUMOR MANAGEMENT

(71) Applicant: Amazon Technologies, Inc., Seattle, WA (US)

(72) Inventors: Anjali Yuan Narayan-Chen, Santa Clara, CA (US); Jiao Sun, Los Angeles, CA (US); Shereen Oraby, Santa Clara, CA (US); Alessandra Cervone, Sunnyvale, CA (US); Tagyoung Chung, Palo Alto, CA (US); Jing Huang, Mountain View, CA (US); Yang Liu, Los Altos, CA (US); Nanyun Peng, Los Angeles, CA (US); Arindam Mandal, Redwood City, CA (US); Premkumar Natarajan, Rolling Hills Estates, CA (US)

(73) Assignee: Amazon Technologies, Inc., Seattle, WA (US)

( * ) Notice: Subject to any disclaimer, the term of this patent is extended or adjusted under 35 U.S.C. 154(b) by 376 days.

(21) Appl. No.: 18/082,790

(22) Filed: Dec. 16, 2022

Related U.S. Application Data

(60) Provisional application No. 63/417,882, filed on Oct. 20, 2022.

(51) Int. Cl.
*G06F 40/35* (2020.01)
*G06F 40/151* (2020.01)
*G06F 40/289* (2020.01)
*G10L 15/06* (2013.01)
*G10L 15/18* (2013.01)
*G10L 15/22* (2006.01)

(52) U.S. Cl.
CPC ............ *G06F 40/35* (2020.01); *G06F 40/151* (2020.01); *G06F 40/289* (2020.01); *G10L 15/063* (2013.01); *G10L 15/1815* (2013.01); *G10L 15/22* (2013.01)

(58) Field of Classification Search
USPC ....................................... 704/1–504
See application file for complete search history.

(56) References Cited

U.S. PATENT DOCUMENTS

| | | | |
|---|---|---|---|
| 9,858,925 B2 * | 1/2018 | Gruber | G10L 15/18 |
| 10,037,768 B1 * | 7/2018 | Akkiraju | G06Q 10/06316 |
| 10,297,273 B2 * | 5/2019 | Akkiraju | G10L 15/22 |
| 10,311,895 B2 * | 6/2019 | Akkiraju | H04M 3/2236 |
| 10,424,319 B2 * | 9/2019 | Akkiraju | G10L 15/22 |

(Continued)

OTHER PUBLICATIONS

Karyn Buxman. 2008. Humor in the OR: A Stitch in Time? AORN Journal, Jul. 2008, vol. 88, No. 1, pp. 67-77.

(Continued)

*Primary Examiner* — Marcus T Riley
(74) *Attorney, Agent, or Firm* — Pierce Atwood LLP

(57) ABSTRACT

In accordance with one disclosed method, first data representing first text may be processed using a first machine learning model configured to generate second data representing an explanation as to why the first text is humorous. The second data may be processed, together with the first data, by a second machine learning model configured to generate a value indicating that the first data and the second data correspond to a pun. A device may be caused to take at least a first action based at least in part on the value.

24 Claims, 13 Drawing Sheets

(56) References Cited

U.S. PATENT DOCUMENTS

| | | | | |
|---|---|---|---|---|
| 10,642,939 | B2* | 5/2020 | Toplyn | G10L 15/26 |
| 10,878,817 | B2* | 12/2020 | Toplyn | G06F 40/40 |
| 11,080,012 | B2* | 8/2021 | Lemay | G06Q 50/10 |
| 11,080,485 | B2* | 8/2021 | Toplyn | G06N 3/044 |
| 11,562,142 | B2* | 1/2023 | Nijkamp | G06F 40/35 |
| 11,755,839 | B2* | 9/2023 | Park | G06F 40/295 704/9 |
| 12,136,414 | B2* | 11/2024 | Thomas | G10L 15/1815 |
| 12,211,495 | B2* | 1/2025 | Natarajan | G10L 15/083 |
| 12,217,001 | B2* | 2/2025 | Bayomi | G06F 40/284 |
| 2004/0088327 | A1* | 5/2004 | Shimomura | G06F 40/56 |
| 2019/0096425 | A1* | 3/2019 | Akkiraju | G06F 16/24578 |
| 2019/0096426 | A1* | 3/2019 | Akkiraju | H04M 3/2236 |
| 2019/0096427 | A1* | 3/2019 | Akkiraju | H04M 3/4936 |
| 2019/0266250 | A1* | 8/2019 | Toplyn | G10L 15/26 |
| 2019/0355381 | A1* | 11/2019 | Akkiraju | G10L 25/63 |
| 2020/0227032 | A1* | 7/2020 | Toplyn | G06F 40/56 |
| 2021/0103700 | A1* | 4/2021 | Toplyn | G06N 20/00 |
| 2022/0067077 | A1* | 3/2022 | Tupakula | G06F 16/345 |
| 2022/0277141 | A1* | 9/2022 | Nijkamp | G06F 40/295 |
| 2023/0056680 | A1* | 2/2023 | Thomas | G10L 15/065 |
| 2024/0386189 | A1* | 11/2024 | Malladi | G06F 40/166 |
| 2024/0386190 | A1* | 11/2024 | Malladi | G06N 3/044 |

OTHER PUBLICATIONS

Anne Cutler, et al. 1977. On the role of sentence stress in sentence processing*, Language and Speech, pp. 1-10.

Joseph L. Fleiss. 1973. The Equivalence of Weighted Kappa and the Intraclass Correlation Coefficient as Measures of Reliability. Educational and Psychological Measurement, 1973, vol. 33, pp. 613-619.

Mikyong Kim, et al. 2000. Patterns of Comprehension and Production of Nouns and Verbs in Agrammatism: Implications for Lexical Organization. Brain and Language vol. 74, pp. 1-25. Retrieved from http://www.idealibrary.com.

Jacob L. Moreno. 1955. Theory of Spontaneity-Creativity. Sociometry, vol. 18, No. 4, pp. 105-118. Retrieved from JSTOR, https://www.jstor.org/stable/2785848; or https://doi.org/10.2307/2785848.

Stuart Rose, et al. 2010. Automatic keyword extraction from individual documents. Text Mining: Applications and Theory, vol. 1, pp. 1-20.

Yufeng Diao, et al. 2019. Heterographic Pun Recognition via Pronunciation and Spelling Understanding Gated Attention Network. The World Wide Web Conference, pp. 363-371.A.

Abolfazl Horri. 2011. Linguistic mechanisms of humor: Pun and/or ambiguity. Language Related Research, vol. 2, Issue 2, pp. 19-40. Abstract only, retrieved from https://scholar.google.com/citations?view_op=view_citation&hl=en&user=zbWiVNIAAAAJ&citation_for_view=zbWiVNIAAAAJ:Se3iqnhoufwC.

U.S. Appl. No. 18/082,838, filed Dec. 16, 2022.

Sura Dhiaa Ibraheem, et al. 2016. Pun and (Un)Intentional Humor. Journal of American Academic Research. Retrieved from https://www.researchgate.net/publication/299524825, pp. 1-18.

Jacob Devlin, et al. 2019. BERT: Pre-training of Deep Bidirectional Transformers for Language Understanding. In Proceedings of North American Association for Computational Linguistics—Human Language Technologies 2019, pp. 4171-4186. Association for Computational Linguistics.

Aparna Garimella, et al. 2020. Judge me by my size (noun), do you? YodaLib: A Demographic-Aware Humor Generation Framework. In Proceedings of the 28th International Conference on Computational Linguistics (Online), pp. 2814-2825. Association for Computational Linguistics.

Md Kamrul Hasan, et al. 2019. UR-Funny: A Multimodal Language Dataset for Understanding Humor. In Proceedings of the 2019 Conference on Empirical Methods in Natural Language Processing and the 9th International Joint Conference on Natural Language Processing, pp. 2046-2056. Association for Computational Linguistics.

Tatsunori B. Hashimoto, et al. 2019. A Retrieve-and-Edit Framework for Predicting Structured Outputs. 32nd Conference on Neural Information Processing Systems (NIPS 2018). Retrieved from https://dl.acm.org/doi/10.5555/3327546.3327670, pp. 1-11.

He He, et al. 2019. Pun Generaration with Surprise. In Proceedings of NAACL HLT 2019, pp. 1734-1744. Association for Computational Linguistics.

Pengcheng He, et al. 2021. DeBERTa: Decoding-Enhanced BERT with Dis-Entangled Attention. Published as a conference paper at ICLR 2021. arXiv preprint, arXiv:2006.03654v6, pp. 1-23.

Bryan Anthony Hong, et al. 2009. Automatically Extracting Word Relationships as Templates for Pun Generation. In Proceedings of the NAACL HLT Workshop on Computational Approaches to Linguistic Creativity, pp. 24-31. Association for Computational Linguistics.

I-Hung Hsu, et al. 2022. DEGREE: A Data-Efficient Generation-Based Event Extraction Model. In Proceedings of the 2022 Conference of the North American Chapter of the Association for Computational Linguistics: Human Language Technologies, pp. 1890-1908. Association for Computational Linguistics.

Kuan-Hao Huang, et al. 2021. Generating Syntactically Controlled Paraphrases without Using Annotated Paralell Pairs. In Proceedings of the 16th Conference of the European Chapter of the Association for Computational Linguistics, pp. 1022-1033. Association for Computational Linguistics.

Mike Lewis, et al. 2020. BART: Denoising sequence-to-sequence pre-training for natural language generation, translation, and comprehension. In Proceedings of the 58th Annual Meeting of the Association for Computational Linguistics, pp. 7871-7880. Association for Computational Linguistics.

Yinhan Liu, et al. 2019. RoBERTa: A Robustly Optimized BERT Pretraining Approach. arXiv preprint arXIV:1907.11692v1, 13 pages.

Ilya Loshchilov, et al. 2019. Decoupled Weight Decay Regularization. In 7th International Conference on Learning Representations, ICLR 2019. Retrieved from https://openreview.net/pdf?id=Bkg6RiCqY7, 18 pages.

Fuli Luo, et al. 2019. Pun-GAN: Generative Adversarial Network for Pun Generation. In Proceedings of the 2019 Conference on Empirical Methods in Natural Language Processing and the 9th International Joint Conference on Natural Language Processing, pp. 3388-3393. Association for Computational Linguistics.

Tristan Miller, et al. 2015. Automatic disambiguation of English puns. In Proceedings of the 53rd Annual Meeting of the Association for Computational Linguistics and the 7th International Joint Conference on Natural Language Processing, pp. 719-729. Association for Computational Linguistics.

Tristan Miller, et al. 2017. SemEval-2017 Task 7: Detection and Interpretation of English puns. In Proceedings of the 11th International Workshop on Semantic Evaluation (SemEval-2017), pp. 58-58. Association for Computational Linguistics.

Anirudh Mittal, et al. 2021. "So You Think You're Funny?": Rating the Humour Quotient in Standup Comedy. In Proceedings of the 2021 Conference on Empirical Methods in Natural Language Processing, pp. 10073-10079. Association for Computational Linguistics.

Anirudh Mittal, et al. 2022. AmbiPun: Generating humorous puns with ambiguous context. In Proceedings of the 2022 Conference of the North American Chapter of the Association for Computational Linguistics: Human Language Technologies, pp. 1053-1062. Association for Computational Linguistics.

Jeffrey Pennington, et al. 2014. GloVe: Global vectors for word representation. In Proceedings of the 2014 Conference on Empirical Methods in Natural Language Processing (EMNLP), pp. 1532-1543. Association for Computational Linguistics.

Saša Petrovic, et al. 2013. Unsupervised joke generation from big data. In Proceedings of the 51st Annual Meeting of the Association for Computational Linguistics (vol. 2: Short Papers), pp. 228-232. Association for Computational Linguistics.

Colin Raffel, et al. 2020. Exploring the Limits of Transfer Learning with a Unified Text-to-Text Transformer. Journal of Machine Learning Research, 21 (2020). arXiv preprint arXiv:1910.10683v3, 67 pages.

(56) References Cited

OTHER PUBLICATIONS

Graeme Ritchie. 2005. Computational Mechanisms for Pun Generation. In Proceedings of the Tenth European Workshop, 8 pages. Association for Computational Linguistics.

Jiao Sun, et al. 2021. AESOP: Paraphrase generation with adaptive syntactic control. In Proceedings of the 2021 Conference on Empirical Methods in Natural Language Processing, pp. 5176-5189. Association for Computational Linguistics.

Jiao Sun, et al., 2022. ExPUNations: Augmenting Puns with Keywords and Explanations. arXiv preprint arXiv:2210/13513v1, 16 pages.

Yufei Tian, et al. 2022. Zero-shot Sonnet Generation with Discourse-level Planning and Aesthetics Features. In Proceedings of the 2022 Conference of the North American Chapter of the Association for Computational Linguistics: Human Language Technologies, pp. 3587-3599. Association for Computational Linguistics.

Alessandro Valitutti, et al. 2013. In Proceedings of the 51st Annual Meeting of the Association for Computational Linguistics, pp. 243-248. Association for Computational Linguistics.

Thomas Wolf, et al. 2020. Transformers: State-of-the-art natural language processing. In Proceedings of the 2020 Conference on Empirical Methods in Natural Language Processing: System Demonstrations, pp. 38-45, Online. Association for Computational Linguistics.

Ziqing Yang, et al. 2020. TextBrewer: An Open-Source Knowledge Distillation Toolkit for Natural Language Processing. In Proceedings of the 58th Annual Meeting of the Association for Computational Linguistics: System Demonstrations, pp. 9-16, Online. Association for Computational Linguistics.

Zixiaofan Yang, et al. Julia Hirschberg. 2021. CHoRaL: Collecting Humor Reaction Labels from Millions of Social Media Users. In Proceedings of the 2021 Conference on Empirical Methods in Natural Language Processing, pp. 4429-4435, Online and Punta Cana, Dominican Republic. Association for Computational Linguistics.

Zhiwei Yu, et al. 2018. A Neural Approach to Pun Generation. In Proceedings of the 56th Annual Meeting of the Association for Computational Linguistics (vol. 1: Long Papers), pp. 1650-1660. Association for Computational Linguistics.

Zhiwei Yu, et al. 2020. Homophonic Pun Generation with Lexically Constrained Rewriting. In Proceedings of the 2020 Conference on Empirical Methods in Natural Language Processing, Online, pp. 2870-2876. Association for Computational Linguistics.

Yukun Zhu, et al. 2015. Aligning Books and Movies: Towards Story-like Visual Explanations by Watching Movies and Reading Books, pp. 19-27. arXiv preprint arXiv:1506.06724v1, 23 pages.

Satanjeev Banerjee, et al. 2005. METEOR: An automatic metric for MT evaluation with improved correlation with human judgments. In Proceedings of the ACL Workshop on Intrinsic and Extrinsic Evaluation Measures for Machine Translation and/or Summarization, pp. 65-72. Association for Computational Linguistics.

Oana-Maria Camburu, et al. 2018. e-SNLI: Natural Language Inference with Natural Language Explanations. In Proceedings of Neural Information Processing Systems. Advances in Neural Information Processing Systems 31 (NeurIPS 2018), pp. 1-11.

Santiago Castro, et al. 2018. A Crowd-Annotated Spanish Corpus for Humor Analysis In Proceedings of the Sixth International Workshop on Natural Language Processing for Social Media, pp. 7-11. Association for Computational Linguistics.

Miruna-Adriana Clinciu, et al. 2021. A Study of Automatic Metrics for the Evaluation of Natural Language Explanations. In Proceedings of the 16th Conference of the European Chapter of the Association for Computational Linguistics: Main Volume, pp. 2376-2387, Online. Association for Computational Linguistics.

Alon Jacovi, et al. 2020. Towards Faithfully Interpretable NLP Systems: How Should We Define and Evaluate Faithfulness? In Proceedings of the 58th Annual Meeting of the Association for Computational Linguistics, pp. 4198-4205. Association for Computational Linguistics.

Peter Jansen, et al. 2018. WorldTree: A Corpus of Explanation Graphs for Elementary Science Questions supporting Multi-Hop Inference. In Proceedings of the Eleventh International Conference on Language Resources and Evaluation (LREC 2018), pp. 2732-2740. European Language Resources Association (ELRA).

Justine T. Kao, et al. 2016. A Computational Model of Linguistic Humor in Puns. Cognitive Science, 40(5), pp. 1270-1285. Retrieved from https://www.ncbi.nlm.nih.gov/pmc/articles/PMC5042108.

Maxime Kayser, et al. 2021. e-ViL: A Dataset and Benchmark for Natural Language Explanations in Vision-Language Tasks. e-ViL: A Dataset and Benchmark for Natural Language Explanations in Vision-Language Tasks, pp. 1-24. arXiv preprint arXiv:2105.03761v2.

Sawan Kumar, et al. 2020. NILE : Natural Language Inference with Faithful Natural Language Explanations. In Proceedings of the 58th Annual Meeting of the Association for Computational Linguistics, pp. 8730-8742. Association for Computational Linguistics.

Wang Ling, et al. 2017. Program Induction by Rationale Generation: Learning to Solve and Explain Algebraic Word Problems. In Proceedings of the 55th Annual Meeting of the Association for Computational Linguistics, pp. 158-167. Association for Computational Linguistics.

Binny Mathew, et al. 2022. HateXplain: A Benchmark Dataset for Explainable Hate Speech Detection*. arXiv preprint arXiv 2012.10289v.2, 12 pages.

Kishore Papineni, et al. 2002. BLEU: a Method for Automatic Evaluation of Machine Translation. In Proceedings of the 40th Annual Meeting of the Association for Computational Linguistics, pp. 311-318. Association for Computational Linguistics.

Nazneen Fatema Rajani, et al. 2019. Explain yourself! Leveraging Language Models for Commonsense Reasoning. In Proceedings of the 57th Annual Meeting of the Association for Computational Linguistics, pp. 4932-4942. Association for Computational Linguistics.

Jiao Sun, et al. 2022. Context-Situated Pun Generation. arXiv preprint arXiv:2210.13522v1, 14 pages.

Orion Weller, et al. 2019. Humor Detection: A Transformer Gets the Last Laugh. In Proceedings of the 2019 Conference on Empirical Methods in Natural Language Processing and the 9th International Joint Conference on Natural Language Processing, pp. 3621-3625. Association for Computational Linguistics.

Sarah Wiegreffe, et al. 2021. Measuring Association Between Labels and Free-Text Rationales. In the Proceedings of the 2021 Conference on Empirical Methods in Natural Language Processing, 19 pages. Retrieved from https://aclanthology.org/2021.emnlp-main.804.pdf.

Wangchunshu Zhou, et al. 2022. Towards Interpretable Natural Language Understanding with Explanations as Latent Variables. 34th Conference on Neural Information Processing Systems (NeurIPS 2020), pp. 1-16. arXiv preprint arXiv:2011.05268v3.

Yanyan Zou, et al. 2019. Joint Detection and Location of English Puns. In Proceedings of NAACL-HLT 2019, pp. 2117-2123. Association for Computational Linguistics.

Office Action mailed Feb. 5, 2025 for U.S. Appl. No. 18/082,838.

* cited by examiner

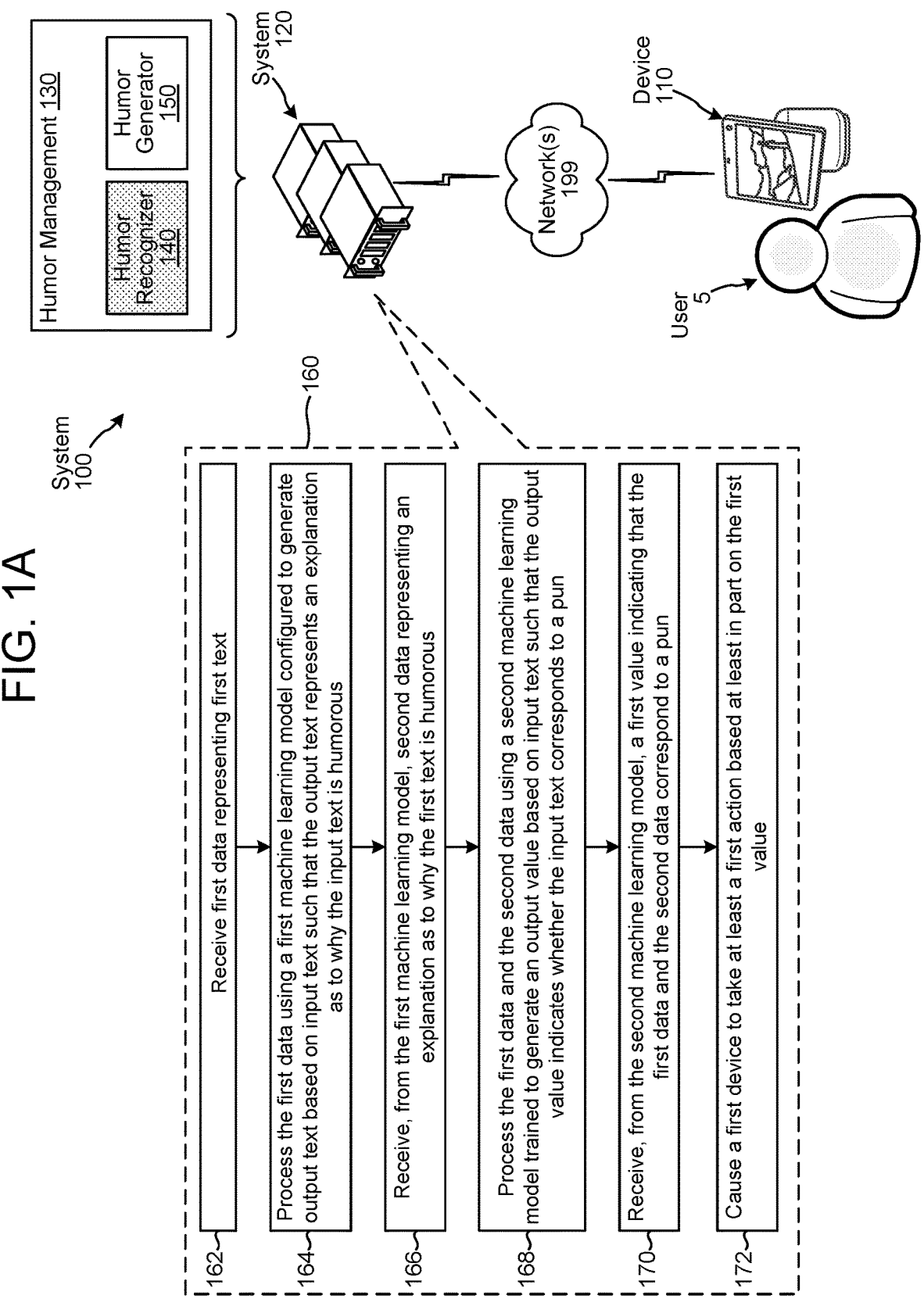

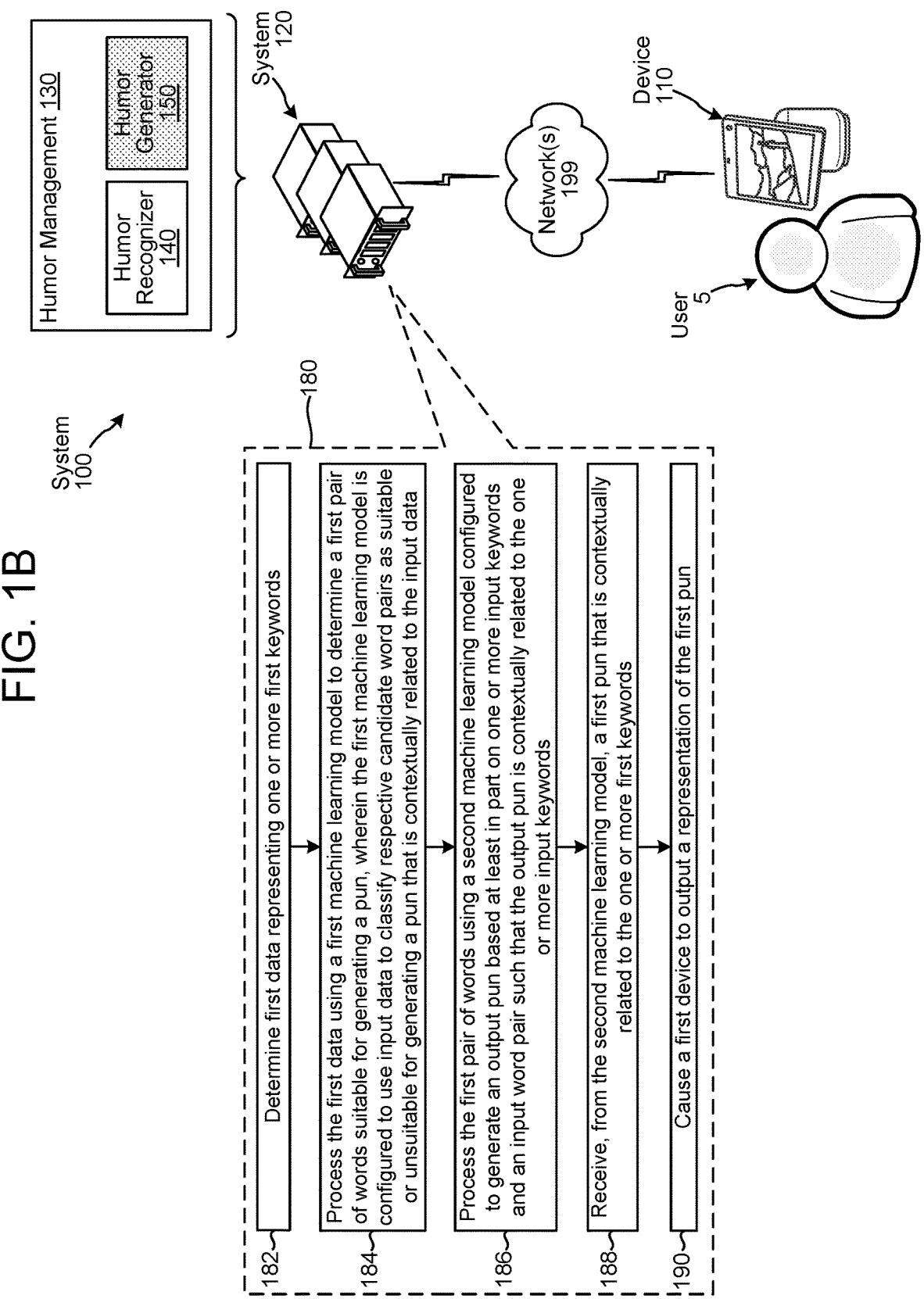

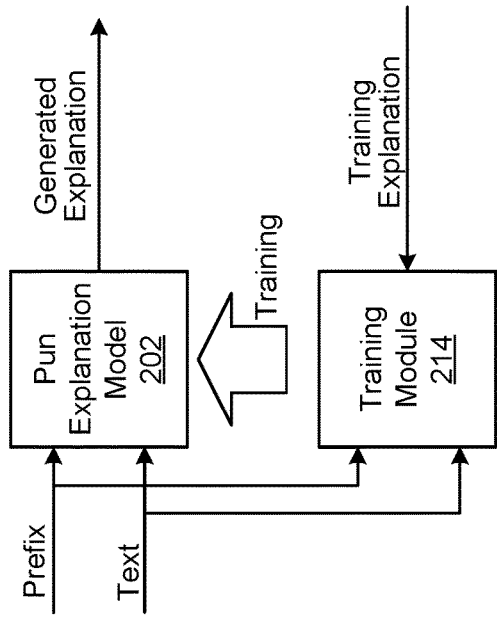
FIG. 2A
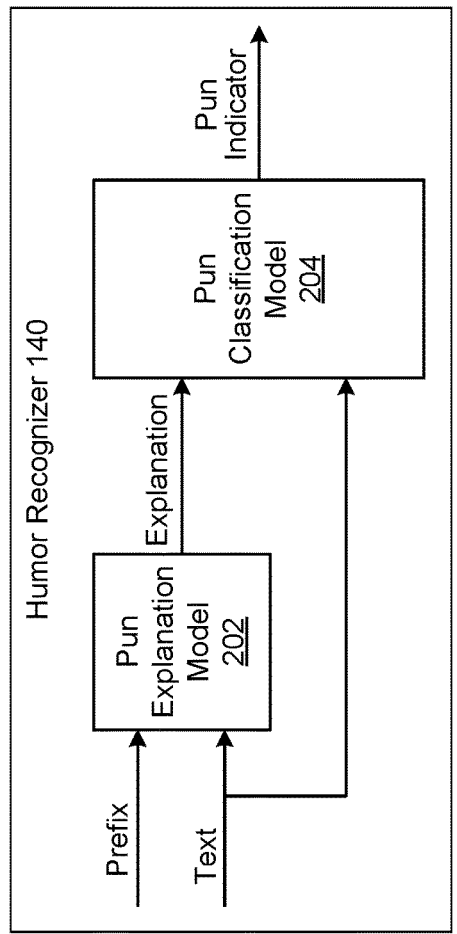
FIG. 2B
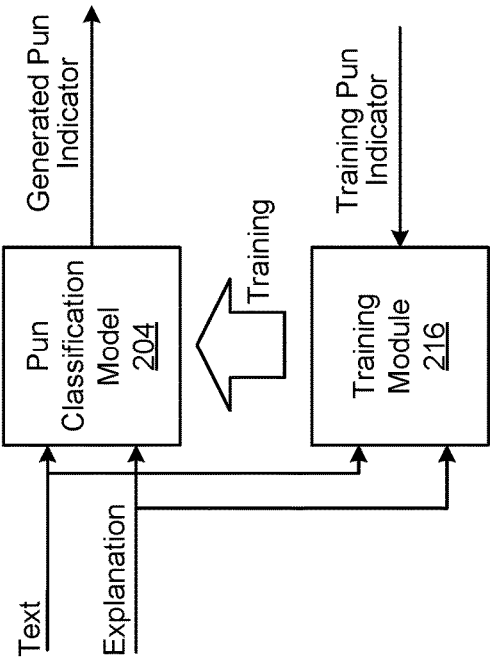
FIG. 2C
FIG. 2D

VIRTUAL ASSISTANT HUMOR MANAGEMENT

CROSS-REFERENCE TO RELATED APPLICATION

This application claims the benefit of and priority to U.S. Provisional Patent Application No. 63/417,882, filed Oct. 20, 2022, and entitled "VIRTUAL ASSISTANT PUN GENERATION AND MANAGEMENT," in the names of Anjali Yuan Narayan-Chen, et al. The above provisional application is herein incorporated by reference in its entirety.

BACKGROUND

Natural language processing systems have progressed to the point where humans can interact with and control computing devices using their voices. Such systems employ techniques to identify the words spoken by a user based on the various qualities of received input data. Speech recognition combined with natural language understanding processing techniques enable speech-based user control of computing devices to perform tasks based on the spoken inputs. Speech recognition and natural language understanding processing techniques are sometimes referred to collectively or separately as spoken language understanding (SLU) processing. SLU processing may be used by computers, hand-held devices, telephone computer systems, kiosks, and a wide variety of other devices to improve human-computer interactions.

BRIEF DESCRIPTION OF DRAWINGS

For a more complete understanding of the present disclosure, reference is now made to the following description taken in conjunction with the accompanying drawings.

FIG. 1A illustrates an example system configured to recognize whether and/or why content is humorous in accordance with some embodiments of the present disclosure;

FIG. 1B illustrates an example system configured to generate humorous content based on keywords representing a current context, such as content of an ongoing dialog between a user and a voice-controlled electronic device, in accordance with some embodiments of the present disclosure;

FIG. 2A is a block diagram illustrating example components that may be included in the humor recognizer shown in FIG. 1A;

FIG. 2B is a table showing example data that may be used to train the pun explanation model and/or the pun classification model shown in FIG. 2A;

FIG. 2C illustrates an example process for training the pun explanation model shown in FIG. 2A using training data from the table shown in FIG. 2B;

FIG. 2D illustrates an example process for training the pun classification model shown in FIG. 2A using training data from the table shown in FIG. 2B;

DETAILED DESCRIPTION

Figures 3A, 3B:
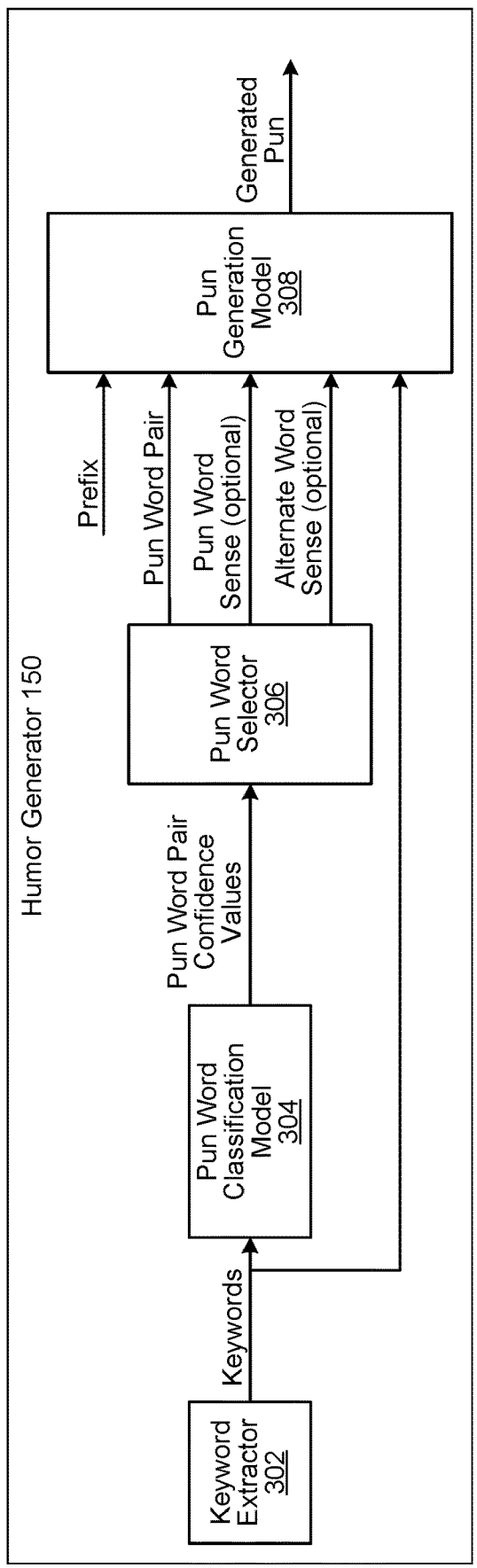
FIG. 3A is a block diagram illustrating example components that may be included in the humor generator shown in FIG. 1B.
FIG. 3B is a table showing example data that may be used to train the pun word classification model and/or the pun generation model shown in FIG. 3A.

Automatic speech recognition (ASR) is a field of computer science, artificial intelligence, and linguistics concerned with transforming audio data associated with speech into a token or textual representation of that speech. Natural language understanding (NLU) is a field of computer science, artificial intelligence, and linguistics concerned with enabling computers to derive meaning from natural language inputs (such as spoken inputs). ASR and NLU are often referred to collectively as spoken language understanding (SLU). Text-to-speech (TTS) is a field of computer science concerning transforming textual and/or other data into audio data that is synthesized to resemble human speech. Natural language generation (NLG) is a field of computer science concerning generation of text from structured data, where the text represents meaningful phrases and sentences in a natural language form.

Humor serves multiple purposes and provides numerous benefits, such as relieving anxiety, avoiding painful feelings, and facilitating learning. As a specific example of humor, the creative uses of puns, wordplay, and ambiguity are important ways to come up with jokes. Pun understanding and generation are particularly challenging tasks to implement for a virtual assistant/chatbot system because they require extensive commonsense and world knowledge to compose and understand, even for humans. Despite growing interest in the area, there are limited amounts of data available in the domain of humor understanding and generation. Existing humor datasets are typically annotated only with binary labels indicating whether each sentence is a joke, pun, or punchline.

Such binary labels may insufficient to benchmark the ability of machine learning models ("models") or other components to understand and generate humorous text, as such sparse supervision signals and coarse-grained annotations may provide insufficient information to perform system configuration/training to effectively incorporate humor aspects in a system-to-user interaction. To account for these shortcomings, offered are techniques for the formulation of a significantly more robust humor dataset that can be used to effectively train (and operate at runtime) models to recognize whether and/or why text is funny. Also offered are techniques to generate humorous text based on keywords representing a current context, such as content of an ongoing dialog between a user and a voice-controlled electronic device. Such tools may be incorporated into computing systems to both detect humorous text and to generate humorous text, enabling the system to interact with humans in a more realistic manner. For example, as outlined below, virtual assistant systems, chatbots, etc., that are adapted to engage in a dialog with a user may be configured to recognize appropriate times to inject humor into the dialog, and then generate humorous content that makes sense within the context of the dialog. Accordingly, by employing the techniques described herein, such systems may effectively be instilled with a human-like "sense of humor," thus making the experience of interacting with such system more natural and enjoyable for users.

A system according to the present disclosure may be configured to incorporate user permissions and may only perform activities disclosed herein if approved by a user. As such, the systems, devices, components, and techniques described herein would be typically configured to restrict processing where appropriate and only process user data in a manner that ensures compliance with all appropriate laws, regulations, standards, and the like. The system and techniques can be implemented on a geographic basis to ensure compliance with laws in various jurisdictions and entities in which the components of the system and/or user are located.

FIGS. 1A and 1B show an example system 100 configured to recognize and/or generate humorous text. In particular, as illustrated, the system 100 may include, among other components, a humor management component 130 that includes a humor recognizer 140 and/or a humor generator 150. FIG. 1A shows an example process 160 that may be performed by the humor recognizer 140, and FIG. 1B shows an example process 180 that may be performed by the humor generator 150. Those processes 160, 180 are both described in more detail below.

As illustrated in FIGS. 1A and 1B, in some implementations, the system 100 may further include a device 110 (e.g., local to a user 5) and a system 120 (e.g., remote from the user 5), with the device 110 being in communication with the system 120 across one or more networks 199. The network(s) 199 may include the Internet and/or any other wide- or local-area network, and may include wired, wireless, and/or cellular network hardware. While the user 5 is illustrated as a human, it should be appreciated that the present disclosure is not limited thereto, and that the user 5 may be a non-human, such as an application/skill, bot, or the like. Further, it should be understood that although the illustrated example shows the humor management component 130 as included within the system 120, some or all of the functionality of the humor management component 130 may additionally or alternatively be implemented elsewhere in the system 100, such as within the device 110.

The device 110 may receive audio of a spoken natural language input from the user 5. The device 110 may generate audio data corresponding to the audio, and may send that audio data to the system 120. The system 120 may receive the audio data corresponding to the spoken natural language input, and may perform ASR and NLU processing on the audio data to determine an appropriate response. In some circumstances, the system 120 may generate responsive text data and perform text-to-speech processing on that text data to generate audio data. The system 120 may then send the generated audio data to the device 110 to cause the device 110 to output an audio response to the user 5. Interactions between the device 110 and system 120 may also be graphical and/or textual based, such as the user inputting text into a graphical user interface of the device 110 and the device 110 sending the text to the system 120 and receiving output text (or other output data, such as display data) in return.

In connection with such exchanges, situations can arise in which the user 5 says something funny, or in which content accessed and/or generated by the system 120, for output by the device 110 or otherwise, includes humorous text. As described in more detail below, in some implementations, one or more models of the humor recognizer 140 can be trained and used to recognize whether and/or why text corresponding to such user input/accessed content is funny. Examples of models that may be employed for such purposes, as well as training data that can be used to train those models, are described below in connection with FIGS. 2A-D. In some implementations, in response to the humor recognizer 140 recognizing funny text, one or more suitable actions can be taken by the system 120. For example, if the user 5 utters a sentence that itself includes a pun, or if, in response to output audio, the user 5 utters a response that includes a play on one or more of the words of the output audio, the system 120 may cause the device 110 to output "I see what you did there!," or a similar phrase, to output a laughing or giggling sound, and/or to output a joke relating to some aspect of the detected humor. In some implementations, the humor generator 150 may monitor text (or other data corresponding to textual representation such as tokens corresponding to text) representing an utterance by the user 5, a response provided by the system 120 to the device 110, multiple turns of an ongoing dialog with the user 5, content accessed by the system 120, etc., to determine one or more or more keywords corresponding to such text. Such data may be in the form of dialog data, for example as determined by dialog management component 485 discussed below. In some implementations, a keyword extraction algorithm, such as the rapid automatic keyword extraction (RAKE) algorithm, may be used to extract one or more keywords from one or more sentences of text, such as those discussed above. In other implementations, the user 5 may utter a request to the device 110, possibly preceded by a wakeword (e.g., "Alexa"), asking the system 100 to output a pun relating to a particular topic or that relates to one or more particular words (e.g., "Alexa, tell me a pun about cats and dogs"), and the system 100 may parse at least a portion of the utterance (e.g., a "command" portion that follows the wakeword) to identify one or more pertinent keywords to use (e.g., "cats" and "dogs"). In any such case, the determined keyword(s) may then be processed by one or more trained models to generate text representing a pun that makes sense in the context of such keyword(s). Examples of models that may be employed to generate puns based on one or more keywords, as well as data that can be used to train those models, are described below in connection with FIGS. 3A-D.

As noted above, in some implementations, one or more models of the humor recognizer 140 (see FIG. 1A) can be trained and used to recognize whether and/or why text corresponding to user input/accessed content is funny. FIG. 2A illustrates two example models (e.g., a pun explanation model 202 and a pun classification model 204) that may be separately trained and then operated together to achieve such objectives. FIG. 2B shows a table 206 including a sampling of an example training data set that may be used to train the pun explanation model 202 and/or the pun classification model 204 in accordance with some embodiments. As shown, the table 206 may include text entries 208, pun indicator entries 210, and explanation entries 212.

The text entries 208 in the table 206 may each include the text of one or more sentences, and the pun indicator entries 210 in the table 206 may indicate whether the corresponding text entries 208 represent puns. For example, in some implementations, a pun indicator entry 210 with Boolean value of "1" may indicate that the corresponding text entry 208 (e.g., "T1" which may correspond to a series of words) represents a pun, whereas a pun indicator entry 210 with Boolean value of "0" may indicate that the corresponding text entry 208 (e.g., "T2" which may correspond to a different series of words) does not represent a pun. The explanation entries 212 may represent human generated explanations for those text entries 208 that represent puns, e.g., the text entries 208 for which the pun indicator entry 210 includes a Boolean value of "1." As one example, the text entry "T1" in the table 206 could be the text "When artists dream in color it's a pigment of their imagination," and the explanation "E1" in the table 206 could be the text "Pigments are non-soluble materials often used in painting, and pigment sounds like figment, which is something that is not real but some believes it is." As another example, the text entry "T3" in the table 206 could be the text "The man found something to catch fish, which was a net gain," and the explanation "E3" in the table 206 could be the text "This is a play on words. A 'net gain' means an increase in revenue but here 'net' refers to how a net is used to catch fish." For text entries 208 that do not represent puns (e.g., "T3" in the table 206), the explanation entries 212 may include the same values as the corresponding text entries 208. Illustrative techniques for accumulating and populating the table 206 with a sufficiently large quantity of suitable data to train the pun explanation model 202 and/or the pun classification model 204 is described in more detail in Appendix A of U.S. Provisional Patent Application No. 63/417,882.

As illustrated in FIG. 2A, after the models 202 and 204 have been trained, as described below in connection with FIGS. 2C and 2D, respectively, the pun explanation model 202 may receive input text (e.g., one or more sentences), together with added prefix text (e.g., "Generate an explanation of the pun:") indicating the operation the pun explanation model 202 is to perform (e.g., based on the pun explanation model 202 having been fine-tuned for generating pun explanations using that same prefix text, as described below), and the pun explanation model 202 may process the input text (e.g., as a set of tokens representing words) to generate a natural language explanation of the pun, such as a description of a reason why the pun is funny and/or interesting. Further, as also illustrated in FIG. 2A, in some implementations, the generated pun explanation may then be input to the pun classification model 204, together with the input text that was provided to the pun explanation model 202, and the pun classification model 204 may process those inputs (e.g., as a set of tokens representing words of the input text and the pun explanation) to generate an indication (e.g., a Boolean output) of whether the input text represents a pun or does not represent a pun.

FIG. 2C illustrates an example process for training the pun explanation model 202 shown in FIG. 2A. In some implementations, the pun explanation model 202 may comprise a text-to-text transfer transformer (or "T5") model that has been pre-trained on a large corpus of textual information and fine-tuned using certain data from the table 206 (shown in FIG. 2B) and an appropriate text prefix (e.g., "Generate an explanation of the pun:"). Various techniques for pre-training and fine-tuning a T5 model are known in the art. As shown in FIG. 2C, a training module 214 may be used to train (or fine-tune) the pun explanation model 202 (e.g., a pre-trained T5 model) by identifying the text entries 208 in the table 206 that represent puns (e.g., based on the values of the pun indicator entries 210), and using those text entries, together with a suitable prefix (e.g., "Generate an explanation of the pun:") and the corresponding explanation entries 212 in the table 206 to train/fine-tune the pun explanation model 202, with the text of the explanation entries 212 being used to supervise the training process.

FIG. 2D shows an example process for training the pun classification model 204 shown in FIG. 2A. In some implementations, the pun classification model 204 may be a bidirectional encoder representations from transformers (or "BERT") model that has been pre-trained and fine-tuned using data from the table 206 (shown in FIG. 2B). Various techniques for pre-training and fine-tuning a BERT model are known in art. For example, as FIG. 2D illustrates, in some implementations, a training module 216 may be used to train or fine-tune the pun classification model 204, e.g., a pre-trained BERT model, using the values in respective rows of table 206, with the values of the pun indicator entries 210 being used to supervise the training process.

As noted above, in some implementations, the humor recognizer 140 may perform the example process 160 (shown in FIG. 1A) to determine whether first text corresponds to a pun and to cause the device 110 to take at least one action, e.g., to output a laugh, a groan, a response recognizing the pun (e.g., "I see what you did there"), another pun contextually related to the detected pun, etc.

At a step 162 of the process 160, the humor management component 130 may receive first data representing the first text. The first text can come from any of a number of sources. In some implementations, for example, at least a portion of the first data can be generated based on audio data representing an utterance by the user 5.

Pursuant to steps 164 and 166 of the process 160, a first machine learning model of the humor recognizer 140 may process the first data, and output second data representing an explanation as to why the first text is humorous. In some implementations, for example, the pun explanation model 202 described in connection with FIGS. 2A and 2C may be used as the first machine learning model.

Pursuant to steps 168 and 170 of the process 160, a second machine learning model of the humor recognizer 140 may process the first data and the second data, and output a first value indicating that the first data and the second data correspond to a pun. In some implementations, for example, the pun classification model 204 described in connection with FIGS. 2A and 2D may be used as the second machine learning model.

At the step 172 of the process 160, the humor recognizer 140 may cause a first device (e.g., the device 110) to take at least a first action based at least in part on the first value output by the second machine learning model. In some implementations, for example, the humor recognizer 140 may prompt a component of a dialog management component 485/585 (e.g., the response management component 620 shown in FIG. 6) to generate audio data corresponding to an acknowledgement of the detected pun, e.g., a laugh, a groan, etc., and may send that audio data to the device 110 to cause the device 110 to output corresponding audio.

As noted above, one or more models of the humor generator 150 (see FIG. 1B) may be trained to process one or more keywords to generate text representing a pun that makes sense in the context of such keyword(s). FIG. 3A illustrates two example models (e.g., a pun word classification model 304 and a pun generation model 308) that may be separately trained and then operated together to achieve that objective. As shown, in some implementations, a keyword extractor 302 may additionally be employed ahead of the pun word classification model 304, and a pun word selector 306 may additionally be deployed between the pun word classification model 304 and the pun generation model 308.

FIG. 3B shows a table 310 including a sampling of an example training data set that may be used to train the pun word classification model 304 and/or the pun generation model 308 in accordance with some embodiments. As shown, in some implementations, the table 310 may include keyword(s) entries 312, pun word entries 314, pun word sense entries 316 (e.g., describing meanings or definitions of the pun words represented by the corresponding pun word entries 314), alternate word entries 318, alternate word sense entries 320 (e.g., describing meanings or definitions of the alternate words represented by the corresponding alternate word entries 318), pun suitability entries 322, and pun entries 324. For each row of the table 310, the pun word represented by the pun word entry 314 (e.g., PW1) and the alternate word represented by the alternative word entry 318 (e.g., AW1) may together form a "pun word pair" that is associated with the one or more keywords represented by the keyword(s) entry 312 (e.g., K1, K2) in that same row. The pun word sense entry 316 (e.g., PWS1) may represent a meaning or definition of the pun word represented by the corresponding pun word entry 316 (e.g., PW1), and the alternate word sense entry 320 (e.g., AWS1) may represent a meaning or definition of the alternate word represented by the corresponding alternate word entry 318 (e.g., AW1). As an illustrative example, K1 and K2 may be "construction" and "workers," respectively, PW1 may be "stair," PWS1 may be "support consisting of a place to rest the foot while ascending or descending a stairway," AW1 may be "stare," AWS1 may be "look at with fixed eyes," and P1 may be "Two construction workers had a staring contest." The pun suitability indicator entries 322 may indicate whether the table 310 includes suitable puns (e.g., P1) corresponding to the pun word pairs (e.g., PW1 and AW1) and the keyword(s) (e.g., K1 and K2) in the respective rows.

As illustrated in FIG. 3A, after the models 304 and 308 have been trained, as described below in connection with FIGS. 3C and 3D, respectively, the pun classification model 304 may receive one or more keywords from the keyword extractor 302, and may process the received keyword(s) to determine one or more pun word pairs that are compatible with such keyword(s). For each pun word pair that is identified as compatible, the pun word classification model 304 may output a confidence value indicating a level of confidence of that the pun word pair is compatible with the keyword(s). The pun word selector 306 may then select one or more pun word pairs having the highest confidence level(s), and may provide those pun word pairs and (optionally) their respective senses to the pun generation model 308. The pun generation model 308 may then process those pun word pairs (and, optionally, senses), together with the keyword(s) received from the keyword extractor 302 as well as an added text prefix indicating the operation the pun generation model 308 is to perform (e.g., "Generate a pun using . . . in context . . . "), to generate a suitable pun. Similar to the pun explanation model 202 described above, the pun generation model 308 may have been fine-tuned for generating puns using that same prefix text (e.g., "Generate a pun using . . . in context . . . ").

Figure 3C:
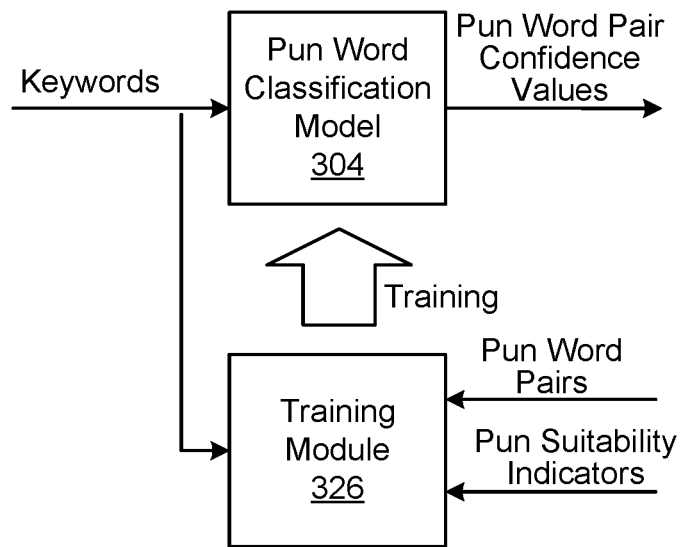
FIG. 3C illustrates an example process for training the pun word classification model shown in FIG. 3A using training data from the table shown in FIG. 3B.

FIG. 3C shows an example process for training the pun word classification model 304 shown in FIG. 3A. In some implementations, similar to the pun classification model 204 described above, the pun word classification model 304 may be a BERT model that has been pre-trained and fine-tuned using data from the table 310 (shown in FIG. 3B). As noted above, various techniques for pre-training and fine-tuning a BERT model are known in the art. For example, as FIG. 3C illustrates, in some implementations, a training module 326 may be used to train or fine-tune the pun word classification model 304, e.g., a pre-trained BERT model, using the keyword(s) and corresponding pun word pairs and pun suitability indicators from respective rows of the table 310, with the pun word pairs and pun suitability indicators being used to supervise the training process. Alternatively, the pun word classification model 304 may use an unsupervised method, e.g., using a natural language inferencing (NLI) model (which may be part of an NLU component such as 460 or part of some other component), to quantify the semantic similarity between the keyword(s) and the respective pun word pairs. In either case, the pun word classification model 304 may identify pun word pairs meeting a threshold level of suitability for generating a pun in the context of the keyword(s), and may additionally or alternatively output an indicator of a degree of confidence that those pun word pairs are suitable for generating a pun in the context of the keyword(s). Pun word pairs for which the degree of confidence determined by the pun word classification model 304 exceeds the threshold may thus be deemed suitable for generating a pun in the context of the keyword (s), whereas pun word pairs for which the degree of confidence determined by the pun word classification model 304 does not exceed the threshold may be deemed unsuitable for generating a pun in the context of the keyword(s).

Figure 3D:
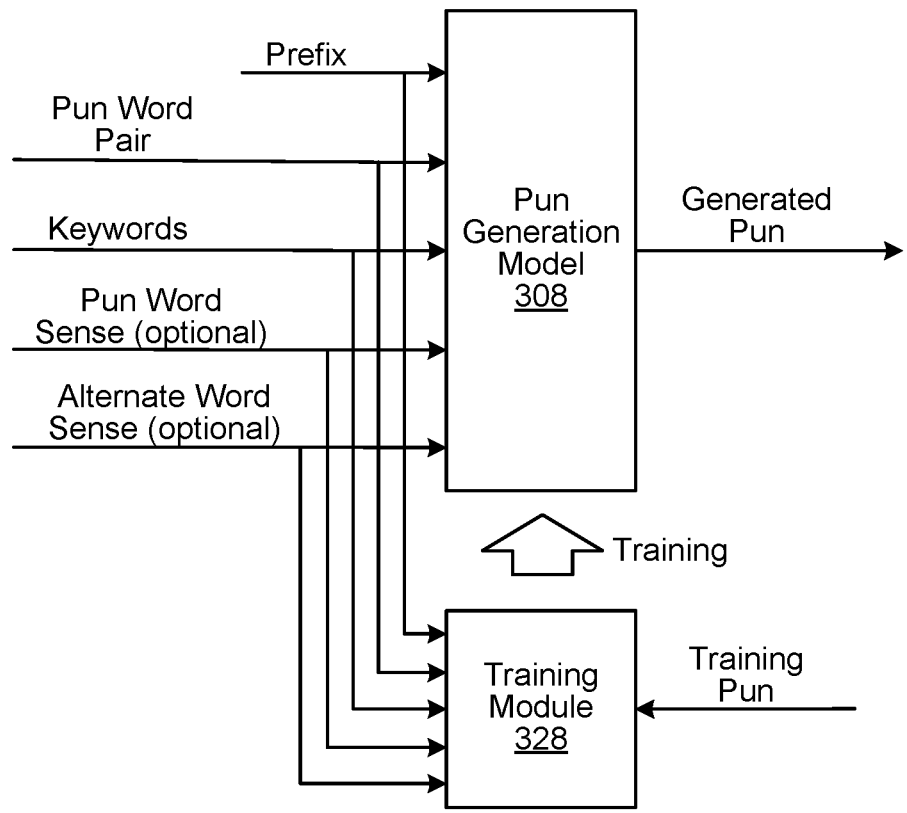
FIG. 3D illustrates an example process for training the pun generation model shown in FIG. 3A using training data from the table shown in FIG. 3B.

FIG. 3D illustrates an example process for training the pun generation model 308 shown in FIG. 3A. In some implementations, similar to the pun explanation model 202 described above, the pun generation model 308 may comprise a T5 model that has been pre-trained and fine-tuned using certain data from the table 310 (shown in FIG. 3B) and an appropriate text prefix. As noted above, various techniques for pre-training and fine-tuning a T5 model are known in the art. As shown in FIG. 3D, a training module 328 may be used to train (or fine-tune) the pun generation model 308 (e.g., a pre-trained T5 model) by identifying the rows in the table 310 that include puns (e.g., based on the values of the pun suitability indicator entries 322), and using the entries in those rows, together with a suitable prefix (e.g., "Generate a pun using . . . in context . . . "), to train or fine-tune the pun generation model 308, with the text of the pun entries 324 being used to supervise the training process. In some implementations, a T5 model may additionally be pretrained using a corpus of non-pun sentences that use a pun word of a pun word pair. An example technique for performing such additional pre-training of a T5 model is described in Appendix B of U.S. Provisional Patent Application No. 63/417,882.

In other implementations, the pun generation model 308 may employ an AmbiPun model of the type described in Mittal, et al., "AmbiPun: Generating Puns with Ambiguous Context," 2022 *Annual Conference of the North American*

*Chapter of the Association for Computational Linguistics (NAACL)*, arXIV:2205.01825v1 (2022).

As noted above, in some implementations, the humor generator 150 may perform the example process 180 (shown in FIG. 1B) to generate a pun that is contextually related to one of more particular keywords, and to cause the device 110 to output a representation of the generated pun. As explained in more detail below, in some implementations, the generation of a pun pursuant to the process 180 may be triggered based on a determination, based on contextual data from one or more sources, that it is a good time to cause the device 110 to output a representation of a pun.

At a step 182 of the process 180, the humor generator 150 may determine first data representing one or more first keywords. In some implementations, for example, one or more sentences of a dialog between the user 5 and the system 100 may be monitored for keywords that can be used to identify suitable pun word pairs for use in generating puns that are contextually related to the keywords.

At a step 184 of the process 180, a first machine learning model may process the first data to identify a first pair of words (e.g., a pun word pair) suitable for generating a pun. In some implementations, for example, the pun word classification model 304 shown in FIGS. 3A and 3C may be used as the first machine learning model of the step 184, and the pun word selector 306 may process the output of the pun word classification model 304 to select an appropriate pun word pair for use in generating a pun.

At steps 186 and 188 of the process 180, a second machine learning model may process the first pair of words (e.g., the pun word pair selected by the pun word selector 306) to generate a first pun that is contextually related to the one or more first keywords. In some implementations, for example, the pun generation model 308 shown in FIGS. 3A and 3D may be used to generate the first pun.

At a step 190 of the process 180, the humor generator 150 may cause a first device, e.g., the device 110, to output a representation of the first pun. In some implementations, for example, the humor generator 150 may send text data representing the first pun to a component of a dialog management component 485/585 (e.g., the response management component 620 shown in FIG. 6) and that component may perform speech synthesis (e.g., TTS processing) on the text data (or instruct another speech synthesis component, e.g., a TTS component 480/580, to perform TTS processing on the text data) to generate audio data corresponding to the first pun. Such a dialog manager may then send the generated audio data to the device 110 to cause the device 110 to output corresponding audio.

Figure 4:
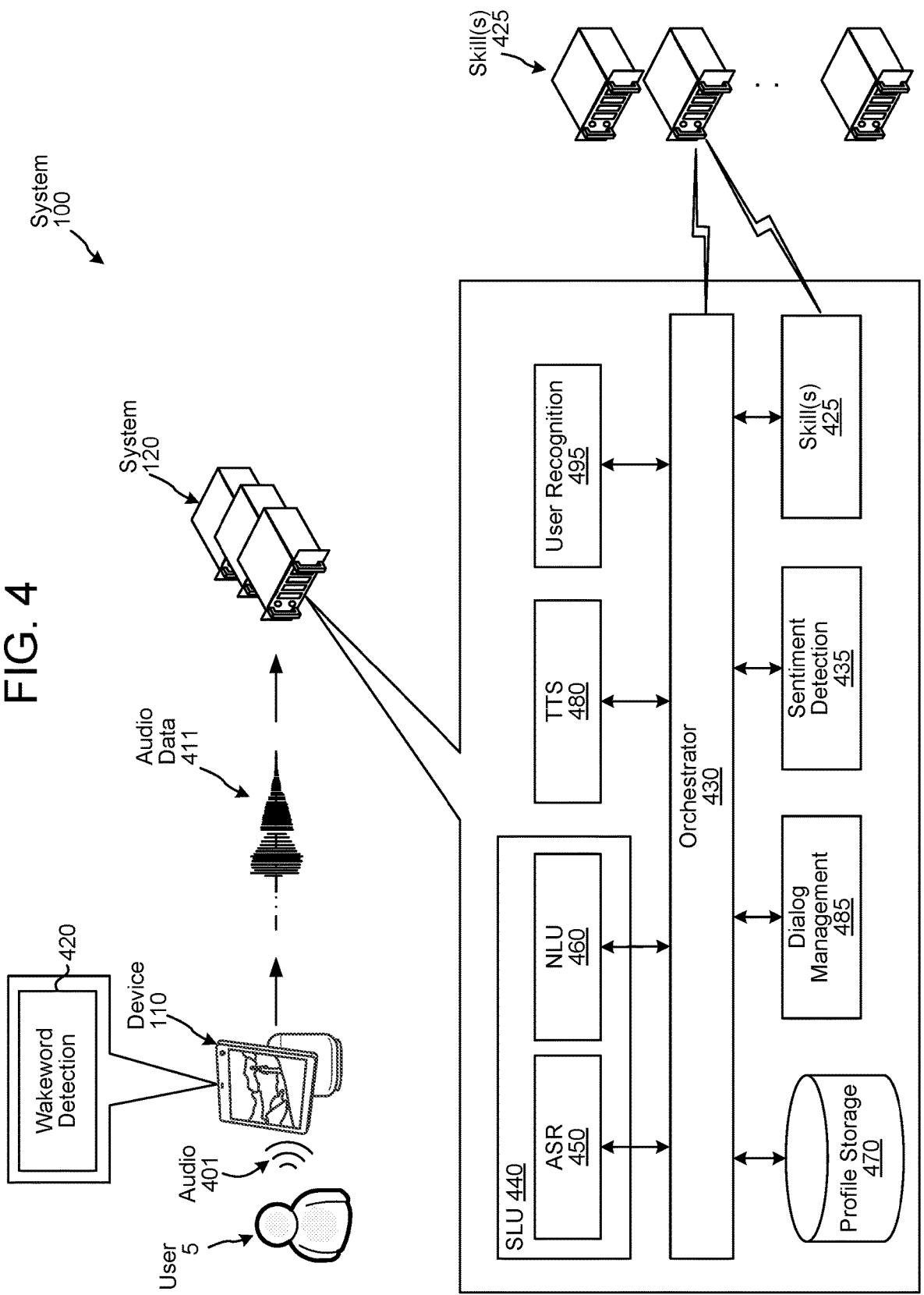
FIG. 4 is a conceptual diagram of components of the system shown in FIGS. 1A and 1i, according to some embodiments of the present disclosure.

FIG. 4 shows example components that may be included in the system 100 shown in FIGS. 1A and 1B in accordance with some embodiments. The various components illustrated in FIG. 4 may be located on the same physical device or on different physical devices. Communication between various components may occur directly or across one or more network(s) 199.

As shown in FIG. 4, a microphone or array of microphones (of or otherwise associated with the device 110) may capture audio 401. The device 110 may process audio data, representing the audio 401, to determine whether speech is detected. The device 110 may use various techniques to determine whether audio data includes speech. In some implementations, for example, the device 110 may apply voice activity detection (VAD) techniques. Such techniques may determine whether speech is present in audio data based on various quantitative aspects of the audio data, such as the spectral slope between one or more frames of the audio data, the energy levels of the audio data in one or more spectral bands, the signal-to-noise ratios of the audio data in one or more spectral bands, or other quantitative aspects. In other implementations, the device 110 may additionally or alternatively implement a classifier configured to distinguish speech from background noise. The classifier may be implemented by techniques such as linear classifiers, support vector machines, and decision trees. In still other implementations, the device 110 may additionally or alternatively apply Hidden Markov Model (HMM) or Gaussian Mixture Model (GMM) techniques to compare the audio data to one or more acoustic models in storage, which acoustic models may include models corresponding to speech, noise (e.g., environmental noise or background noise), or silence. Still other techniques may be used to determine whether speech is present in audio data.

Once speech is detected in audio data, the device 110 may determine if the speech is directed at the device 110/system 120. In at least some embodiments, such determination may be made using a wakeword detection component 420 of the device 110. The wakeword detection component 420 may be configured to detect various wakewords. In at least some examples, each wakeword may correspond to a name of a different digital assistant. An example wakeword/digital assistant name is "Alexa."

Wakeword detection may be performed without performing linguistic analysis, textual analysis, or semantic analysis. Instead, the audio data may be analyzed to determine if specific characteristics of the audio data match preconfigured acoustic waveforms, audio signatures, or other data corresponding to a wakeword.

Thus, the wakeword detection component 420 may compare audio data to stored data to detect a wakeword. One approach for wakeword detection applies general large vocabulary continuous speech recognition (LVCSR) systems to decode audio signals, with wakeword searching being conducted in the resulting lattices or confusion networks. Another approach for wakeword detection builds HMMs for each wakeword and non-wakeword speech signals, respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on wakeword presence. This approach can be extended to include discriminative information by incorporating a hybrid deep neural network (DNN)-HMM decoding framework. In another example, the wakeword detection component 420 may be built on DNN/recursive neural network (RNN) structures directly, without HMM being involved. Such an architecture may estimate the posteriors of wakewords with context data, either by stacking frames within a context window for DNN, or using RNN. Follow-on posterior threshold tuning or smoothing is applied for decision making. Other techniques for wakeword detection, such as those known in the art, may also be used.

Once the wakeword detection component 420 detects a wakeword, the device 110 may "wake" and begin transmitting audio data 411, representing the audio 401, to the system 120. The audio data 411 may include the detected wakeword, or the device 110 may remove the portion of the audio data 411 corresponding to the detected wakeword prior to sending the audio data 411 to the system 120.

The system 120 may include an orchestrator component 430 configured to, among other things, coordinate data transmissions between components of the system 120. The orchestrator component 430 may receive the audio data 411 from the device 110, and may send the audio data 411 to an ASR component 450.

The ASR component 450 may transcribe the audio data 411 into ASR output data including one or more ASR hypotheses. An ASR hypothesis may be configured as a textual interpretation of the speech in the audio data 411, or may be configured in another manner, such as one or more tokens. Each ASR hypothesis may represent a different likely interpretation of the speech represented in the audio data 411. Each ASR hypothesis may be associated with a score (e.g., confidence score, probability score, or the like) representing the associated ASR hypothesis correctly represents the speech in the audio 401.

The ASR component 450 may interpret the speech in the audio data 411 based on a similarity between the audio data 411 and pre-established language models. For example, the ASR component 450 may compare the audio data 411 with models for sounds (e.g., subword units, such as phonemes, etc.) and sequences of sounds to identify words that match the sequence of sounds of the speech represented in the audio data 411.

In at least some instances, instead of the device 110 receiving a spoken natural language input, the device 110 may receive a textual (e.g., typed using a keyboard) natural language input. The device 110 may determine text data representing the textual natural language input, and may send the text data to the system 120, wherein the text data may be received by the orchestrator component 430. The orchestrator component 430 may send the text data or ASR output data, depending on the type of natural language input received, to a NLU component 460.

The NLU component 460 may process the ASR output data or text data to determine one or more NLU hypotheses embodied in NLU output data. The NLU component 460 may perform intent classification (IC) processing on the ASR output data or text data to determine an intent of the natural language input. An intent may correspond to an action to be performed that is responsive to the natural language input. To perform IC processing, the NLU component 460 may communicate with a database of words linked to intents. For example, a music intent database may link words and phrases such as "quiet," "volume off," and "mute" to a <Mute> intent. The NLU component 460 may identify intents by comparing words and phrases in ASR output data or text data to the words and phrases in an intents database. In some embodiments, the NLU component 460 may communicate with multiple intents databases, with each intents database corresponding to one or more intents associated with a particular skill. A "skill" may refer to software, that may be placed on a machine or a virtual machine (e.g., software that may be launched in a virtual instance when called), configured to process NLU output data and perform one or more actions in response thereto.

As one example, IC processing of the natural language input "play my workout playlist" may determine an intent of <PlayMusic>. As another example, IC processing of the natural language input "call mom" may determine an intent of <Call>. As yet another example, IC processing of the natural language input "call mom using video" may determine an intent of <VideoCall>. In still another example, IC processing of the natural language input "what is today's weather" may determine an intent of <OutputWeather>.

The NLU component 460 may also perform named entity recognition (NER) processing on the ASR output data or text data to determine one or more portions, sometimes referred to as slots, of the natural language input that may be needed for post-NLU processing (e.g., processing performed by a skill). As one example, named entity recognition (NER) processing of the natural language input "play [song name]" may determine an entity type of "SongName" and an entity value corresponding to the indicated song name. As another example, NER processing of the natural language input "call mom" may determine an entity type of "Recipient" and an entity value corresponding to "mom." As still another example, NER processing of the natural language input "what is today's weather" may determine an entity type of "Date" and an entity value of "today."

In some embodiments, the intents identifiable by the NLU component 460 may be linked to one or more grammar frameworks with entity types that can be populated with entity values. Each entity type of a grammar framework may correspond to a portion of ASR output data or text data that the NLU component 460 identified as corresponding to an entity value. For example, a grammar framework corresponding to a <PlayMusic> intent may correspond to sentence structures such as "Play {Artist Name}," "Play {Album Name}," "Play {Song name}," "Play {Song name} by {Artist Name}," etc.

For example, the NLU component 460 may perform NER processing to identify words in ASR output data or text data as subject, object, verb, preposition, etc., based on grammar rules and/or models. Then, the NLU component 460 may perform IC processing using the identified verb to identify an intent. Thereafter, the NLU component 460 may again perform NER processing to determine a grammar model associated with the identified intent. For example, a grammar model for a <PlayMusic> intent may specify a list of entity types applicable to play the identified "object" and any object modifier (e.g., a prepositional phrase), such as {Artist Name}, {Album Name}, {Song name}, etc. The NER processing may then involve searching corresponding fields in a lexicon, attempting to match words and phrases in the ASR output data that NER processing previously tagged as a grammatical object or object modifier with those identified in the lexicon.

NER processing may include semantic tagging, which is the labeling of a word or combination of words according to their type/semantic meaning. NER processing may include parsing ASR output data or text data using heuristic grammar rules, or a model may be constructed using techniques such as hidden Markov models, maximum entropy models, log linear models, conditional random fields (CRFs), and the like. For example, NER processing with respect to a music skill may include parsing and tagging ASR output data or text data corresponding to "play mother's little helper by the rolling stones" as {Verb}: "Play," {Object}: "mother's little helper," {Object Preposition}: "by," and {Object Modifier}: "the rolling stones." The NER processing may identify "Play" as a verb based on a word database associated with the music skill, which IC processing determines corresponds to a <PlayMusic> intent.

The NLU component 460 may generate NLU output data including one or more NLU hypotheses, with each NLU hypothesis including an intent and optionally one or more entity types and corresponding entity values. In some embodiments, the NLU component 460 may perform IC processing and NER processing with respect to different skills. One skill may support the same or different intents than another skill. Thus, the NLU output data may include multiple NLU hypotheses, with each NLU hypothesis corresponding to IC processing and NER processing performed on the ASR output or text data with respect to a different skill.

As described above, in some implementations, the system 120 may perform speech processing using two different components (e.g., the ASR component 450 and the NLU component 460). In other implementations, the system 120 may additionally or alternatively implement a spoken language understanding (SLU) component 440 configured to process audio data 411 to determine NLU output data.

The SLU component 440 may be equivalent to a combination of the ASR component 450 and the NLU component 460. Yet, the SLU component 440 may process audio data 411 and directly determine the NLU output data, without an intermediate step of generating ASR output data. As such, the SLU component 440 may take audio data 411 representing a spoken natural language input and attempt to make a semantic interpretation of the spoken natural language input. That is, the SLU component 440 may determine a meaning associated with the spoken natural language input and then implement that meaning. For example, the SLU component 440 may interpret audio data 411 representing a spoken natural language input in order to derive a desired action. The SLU component 440 may output a most likely NLU hypothesis, or multiple NLU hypotheses associated with respective confidence or other scores (such as probability scores, etc.).

As shown in FIG. 4, the system 120 may include or otherwise communicate with one or more skills 425. As noted above, a "skill" may refer to software, that may be placed on a machine or a virtual machine (e.g., software that may be launched in a virtual instance when called), configured to process NLU output data and perform one or more actions in response thereto. For example, for NLU output data including a <PlayMusic> intent, an "artist" entity type, and an artist name as an entity value, a music skill 425 may be called to output music sung by the indicated artist. For further example, for NLU output data including a <TurnOn> intent, a "device" entity type, and an entity value of "lights," a smart home skill 425 may be called to cause one or more "smart" lights to operate in an "on" state. In another example, for NLU output data including an <OutputWeather> intent, a "location" entity type, and an entity value corresponding to a geographic location of the device 110, a weather skill 425 may be called to output weather information for the geographic location. For further example, for NLU output data including a <BookRide> intent, a taxi skill 425 may be called to book a requested ride. In another example, for NLU output data including a <BuyPizza> intent, a restaurant skill 425 may be called to place an order for a pizza.

A skill 425 may operate within the system 100, e.g., as a component of the system 120, the device 110, a restaurant electronic ordering system, a taxi electronic booking system, etc., in order to complete certain functions. Inputs to a skill 425 may come from speech processing interactions or through other interactions or input sources.

A skill 425 may be associated with a domain. A non-limiting list of example domains includes a smart home domain, a music domain, a video domain, a weather domain, a communications domain, a flash briefing domain, a shopping domain, and a custom domain.

The system 120 may include a TTS component 480 that generates audio data including synthesized speech. The data input to the TTS component 480 may come from a skill 425, the orchestrator component 430, or another component of the system 120.

In one method of synthesis called "unit selection," the TTS component 480 may match input data against a database of recorded speech. The TTS component 480 may select matching units of recorded speech and concatenate the units together to form audio data. In another method of synthesis called "parametric synthesis," the TTS component 480 may vary parameters such as frequency, volume, and noise to determine audio data including an artificial speech waveform. Parametric synthesis may use a computerized voice generator, sometimes called a vocoder. In another technique, TTS may rely on neural networks or other machine learning components to process text data into audio data or the like to be processed by a vocoder and/or output as audio of synthesized speech.

The system 120 may include a user recognition component 495. The user recognition component 495 may recognize one or more users using various data. The user recognition component 495 may take as input the audio data 411. The user recognition component 495 may perform user recognition by comparing speech characteristics in the audio data 411 to stored speech characteristics of users. The user recognition component 495 may additionally or alternatively perform user recognition by comparing biometric data (e.g., fingerprint data, iris data, retina data, etc.), received by the system 120 in correlation with a natural language input, to stored biometric data of users. The user recognition component 495 may additionally or alternatively perform user recognition by comparing image data (e.g., including a representation of one or more features of a user), received by the system 120 in correlation with a natural language input, with stored image data including representations of features of different users. The user recognition component 495 may also perform other or additional user recognition processes. For a particular natural language input, the user recognition component 495 may perform processing with respect to stored data of users associated with the device 110 that received the natural language input.

The user recognition component 495 may determine whether a natural language input originated from a particular user. For example, the user recognition component 495 may determine a first value representing a likelihood that a natural language input originated from a first user, a second value representing a likelihood that the natural language input originated from a second user, etc. The user recognition component 495 may also determine an overall confidence regarding the accuracy of user recognition processing.

The user recognition component 495 may output a single user identifier corresponding to the most likely user that originated the natural language input. Alternatively, the user recognition component 495 may output multiple user identifiers (e.g., in the form of an N-best list) with respective values representing likelihoods of respective users originating the natural language input. The output of the user recognition component 495 may be used to inform NLU processing, processing performed by a skill 425, and/or processing performed by other components of the system 120 and/or other systems.

The system 120 may include profile storage 470. The profile storage 470 may include a variety of data related to individual users, groups of users, devices, etc., that interact with the system 120. As used herein, a "profile" refers to a set of data associated with a user, group of users, device, etc. The data of a profile may include preferences specific to the user, group of users, device, etc.; input and output capabilities of one or more devices; internet connectivity data; user bibliographic data; subscription data; skill enablement data; and/or other data.

The profile storage 470 may include one or more user profiles. Each user profile may be associated with a different user identifier. Each user profile may include various user identifying data (e.g., name, gender, address, one or more languages, etc.). Each user profile may also include preferences of the user. Each user profile may include one or more device identifiers, each representing a respective device registered to the user. Each user profile may include skill identifiers that identify the skills 425 that the user has enabled. When a user enables a skill 425, the user is providing the system 120 with permission to allow the skill 425 to execute with respect to the user's natural language inputs. If a user does not enable a skill 425, the system 120 may not execute the skill 425 with respect to the user's natural language inputs.

The profile storage 470 may include one or more group profiles. Each group profile may be associated with a different group identifier. A group profile may be specific to a group of users. That is, a group profile may be associated with two or more individual user profiles. For example, a group profile may be a household profile that is associated with user profiles associated with multiple users of a single household. A group profile may include preferences shared by all the user profiles associated therewith. Each user profile associated with a group profile may additionally include preferences specific to the user associated therewith. That is, a user profile may include preferences unique from one or more other user profiles associated with the same group profile. A user profile may be a stand-alone profile or may be associated with a group profile. A group profile may be associated with (or include) one or more device profiles corresponding to one or more devices associated with the group profile.

The profile storage 470 may include one or more device profiles. Each device profile may be associated with a different device identifier. A device profile may include various device identifying data, input/output characteristics, networking characteristics, etc. A device profile may also include one or more user identifiers, corresponding to one or more user profiles associated with the device profile. For example, a household device's profile may include the user identifiers of users of the household.

The system 120 may also include a dialog management component 485, which may manage various aspects of an ongoing dialog between the user 5 and the system 100. Example components that may be included within the dialog management component 485, as well as example operations that may be performed by such components, are described in detail below in connection with FIGS. 6-8. As described in more detail below, in some implementations, the dialog management component 485 may include one or more components of the humor management component 130 described above.

The system 120 may include a sentiment detection component 435 configured to analyze image data representing a face of the user 5, and/or speech of the user (in particular tone, words, used, etc.), to determine a sentiment (e.g., happy, sad, mad, etc.) of the user 5. Various processing described herein may be based on the sentiment. For example, in some implementations, a determination to invoke the humor generator 150 to generate a pun based on one or more keywords indicative of a current context of a dialog between the user 5 and the system 100, or otherwise, may be based, at least in part on an output of the sentiment detection component 435. For example, if sentiment data from the sentiment detection component 435 indicates a user is frustrated or rushed, the orchestrator component 430, dialog management component 485, or other component may cause the humor generator 150 to be temporarily disabled and/or to ignore the output of the humor generator 150 for purposes of an exchange with a user. Further, if sentiment data from the sentiment detection component 435 indicates a user is happy or in a good mood, the orchestrator component 430, dialog management component 485, or other component may cause the humor generator 150 to be enabled and/or to be more likely to use the output of the humor generator 150 for purposes of an exchange with a user.

Figure 5:
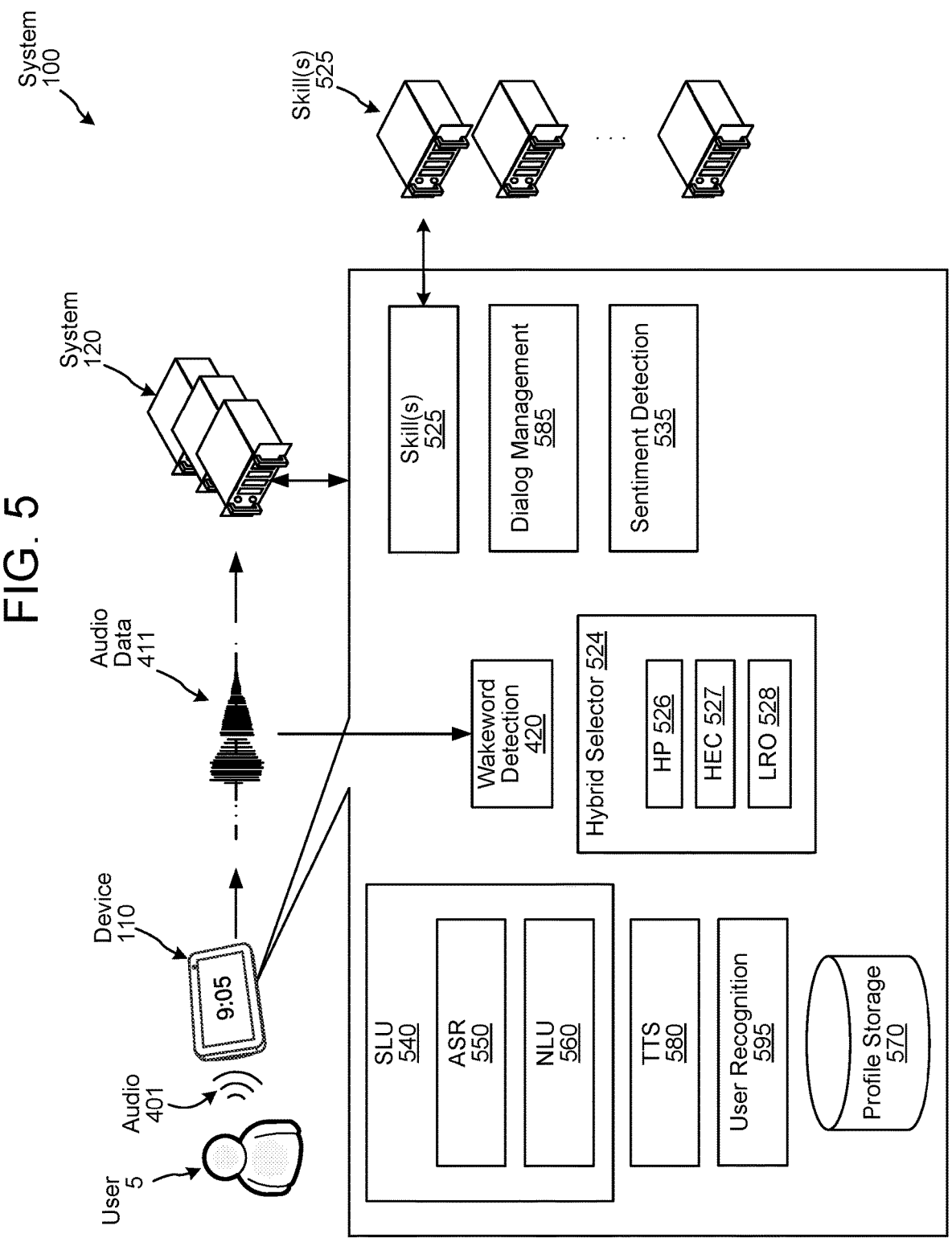
FIG. 5 is a conceptual diagram illustrating components that may be included in the device shown in FIGS. 1A and 1B, according to some embodiments of the present disclosure.

The foregoing describes illustrative components and processing of the system 120. With reference to FIG. 5, the following describes illustrative components and processing of the device 110. As noted previously in connection with FIG. 4, in some embodiments, the system 120 may receive the audio data 411 from the device 110, to recognize speech corresponding to a spoken natural language in the received audio data 411, and to perform functions in response to the recognized speech. In some embodiments, these functions may involve sending directives (e.g., commands) from the system 120 to the device 110 to cause the device 110 to perform an action, such as to output synthesized speech (responsive to the spoken natural language input) via a loudspeaker(s), and/or to control one or more secondary devices by sending control commands to the one or more secondary devices. In other embodiments the device may perform various speech processing operations on its own and/or in conjunction with the system 120.

Thus, when the device 110 is able to communicate with the system 120 over the network(s) 199, some or all of the functions capable of being performed by the system 120 may be performed by sending one or more directives over the network(s) 199 to the device 110, which, in turn, may process the directive(s) and perform one or more corresponding actions. For example, the system 120, using a remote directive that is included in response data (e.g., a remote response), may instruct the device 110 to output synthesized speech via a loudspeaker(s) of (or otherwise associated with) the device 110, to output content (e.g., music) via the loudspeaker(s) of (or otherwise associated with) the device 110, to display content on a display of (or otherwise associated with) the device 110, and/or to send a directive to a secondary device (e.g., a directive to turn on a smart light). It will be appreciated that the system 120 may be configured to provide other functions in addition to those discussed herein, such as, without limitation, providing step-by-step directions for navigating from an origin location to a destination location, conducting an electronic commerce transaction on behalf of the user 5 as part of a shopping function, establishing a communication session (e.g., an audio or video call) between the user 5 and another user, and so on.

As noted above, in some implementations, the device 110 may include a wakeword detection component 420 configured to detect a wakeword (e.g., "Alexa") that indicates to the device 110 that the audio data 411 is to be processed for determining NLU output data. In some embodiments, a hybrid selector 524 of the device 110 (shown in FIG. 5) may send the audio data 411 to the wakeword detection component 420. If the wakeword detection component 420 detects a wakeword in the audio data 411, the wakeword detection component 420 may send an indication of such detection to the hybrid selector 524. In response to receiving the indication, the hybrid selector 524 may send the audio data 411 to the system 120 and/or an on-device ASR component 550. The wakeword detection component 420 may also send an indication, to the hybrid selector 524, that a wakeword was not detected. In response to receiving such an indication, the hybrid selector 524 may refrain from sending the audio data 411 to the system 120, and may prevent the on-device ASR component 550 from processing the audio data 411. In this situation, the audio data 411 can be discarded.

The device 110 may conduct its own speech processing using on-device language processing components (such as an on-device SLU component 540, an on-device ASR component 550, and/or an on-device NLU component 560) similar to the manner discussed above with respect to the speech processing system-implemented SLU component 440, ASR component 450, and NLU component 460. The device 110 may also internally include, or otherwise have access to, other components such as one or more skills 525 (configured to operate in a similar manner as the system-implemented skills 425), a user recognition component 595 (configured to operate in a similar manner as the system-implemented user recognition component 495), profile storage 570 (configured to store similar profile data as the system-implemented profile storage 470), a dialog management component 585 (configured to operate in a similar manner as the system-implemented dialog management component 485), a sentiment detection component 535 (configured to operate in a similar manner as the system-implemented sentiment detection component 435), a TTS 580 (configured to operate in a similar manner as the system-implemented TTS 480), and other components. As described in more detail below, in some implementations, the dialog management component 585 of the device 110 may include one or more components of the humor management component 130 described above. In at least some embodiments, the on-device profile storage 570 may store profile data only for a user or group of users specifically associated with the device 110.

In some embodiments, the on-device language processing components may not have the same capabilities as the language processing components implemented by the system 120. For example, the on-device language processing components may be configured to handle only a subset of the natural language inputs that may be handled by the speech processing system-implemented language processing components. For example, such subset of natural language inputs may correspond to local-type natural language inputs, such as those controlling devices or components associated with a user's home. In such circumstances, the on-device language processing components may be able to interpret and respond to a local-type natural language input more quickly than processing that involves the system 120. If the device 110 attempts to process a natural language input for which the on-device language processing components are not necessarily best suited, the NLU output data, determined by the on-device components, may have a low confidence or other metric indicating that the processing by the on-device language processing components may not be as accurate as the processing that can be done by the system 120.

The hybrid selector 524 of the device 110 may include a hybrid proxy (HP) 526 configured to proxy traffic to/from the system 120. For example, the HP 526 may be configured to send messages to/from a hybrid execution controller (HEC) 527 of the hybrid selector 524. For example, command/directive data received from the system 120 can be sent to the HEC 527 using the HP 526. The HP 526 may also be configured to allow the audio data 411 to pass to the system 120 while also receiving (e.g., intercepting) this audio data 411 and sending the audio data 411 to the HEC 527.

In some embodiments, the hybrid selector 524 may further include a local request orchestrator (LRO) 528 configured to notify the on-device ASR component 550 about the availability of the audio data 411, and to otherwise initiate the operations of on-device language processing when the audio data 411 becomes available. In general, the hybrid selector 524 may control execution of on-device language processing, such as by sending "execute" and "terminate" events/instructions. An "execute" event may instruct a component to continue any suspended execution (e.g., by instructing the component to execute on a previously determined intent in order to determine a directive). Meanwhile, a "terminate" event may instruct a component to terminate further execution, such as when the device 110 receives directive data from the system 120 and chooses to use that remotely determined directive data.

Thus, when the audio data 411 is received, the HP 526 may allow the audio data 411 to pass through to the system 120 and the HP 526 may also input the audio data 411 to the on-device ASR component 550 by routing the audio data 411 through the HEC 527 of the hybrid selector 524, whereby the LRO 528 notifies the on-device ASR component 550 of the audio data 411. At this point, the hybrid selector 524 may wait for response data from either or both the system 120 and/or the on-device language processing components. However, the disclosure is not limited thereto, and in some examples the hybrid selector 524 may send the audio data 411 only to the on-device ASR component 550 without departing from the disclosure. For example, the device 110 may process the audio data 411 on-device without sending the audio data 411 to the system 120.

The on-device ASR component 550 may be configured to receive the audio data 411 from the hybrid selector 524, and to recognize speech in the audio data 411, and the on-device NLU component 560 may be configured to determine an intent from the recognized speech (an optionally one or more named entities), and to determine how to act on the intent by generating NLU output data that may include directive data (e.g., instructing a component to perform an action). In some cases, a directive may include a description of the intent (e.g., an intent to turn off {device A}). In some cases, a directive may include (e.g., encode) an identifier of a second device(s), such as kitchen lights, and an operation to be performed at the second device(s). Directive data may be formatted using Java, such as JavaScript syntax, or JavaScript-based syntax. This may include formatting the directive using JSON. In some embodiments, a device-determined directive may be serialized, much like how remotely-determined directives may be serialized for transmission in data packets over the network(s) 199. In some embodiments, a device-determined directive may be formatted as a programmatic application programming interface (API) call with a same logical operation as a remotely-determined directive. In other words, a device-determined directive may mimic a remotely-determined directive by using a same, or a similar, format as the remotely-determined directive.

A NLU hypothesis (output by the on-device NLU component 560) may be selected as usable to respond to a natural language input, and local response data may be sent (e.g., local NLU output data, local knowledge base information, internet search results, and/or local directive data) to the hybrid selector 524, such as a "ReadyToExecute" response. The hybrid selector 524 may then determine whether to use directive data from the on-device components to respond to the natural language input, to use directive data received from the system 120, assuming a remote response is even received (e.g., when the device 110 is able to access the system 120 over the network(s) 199), or to determine output data requesting additional information from the user 5.

The device 110 and/or the system 120 may associate a unique identifier with each natural language input. The device 110 may include the unique identifier when sending the audio data 411 to the system 120, and the response data from the system 120 may include the unique identifier to identify to which natural language input the response data corresponds.

In some embodiments, the device 110 may include one or more skills 525 that may operate similar to the system-implemented skill(s) 425 described above. The skill(s) 525 installed on (or in communication with) the device 110 may include, without limitation, a smart home skill and/or a device control skill configured to control a second device(s), a music skill configured to output music, a navigation skill configured to output directions, a shopping skill configured to conduct an electronic purchase, and/or the like.

Figure 6:
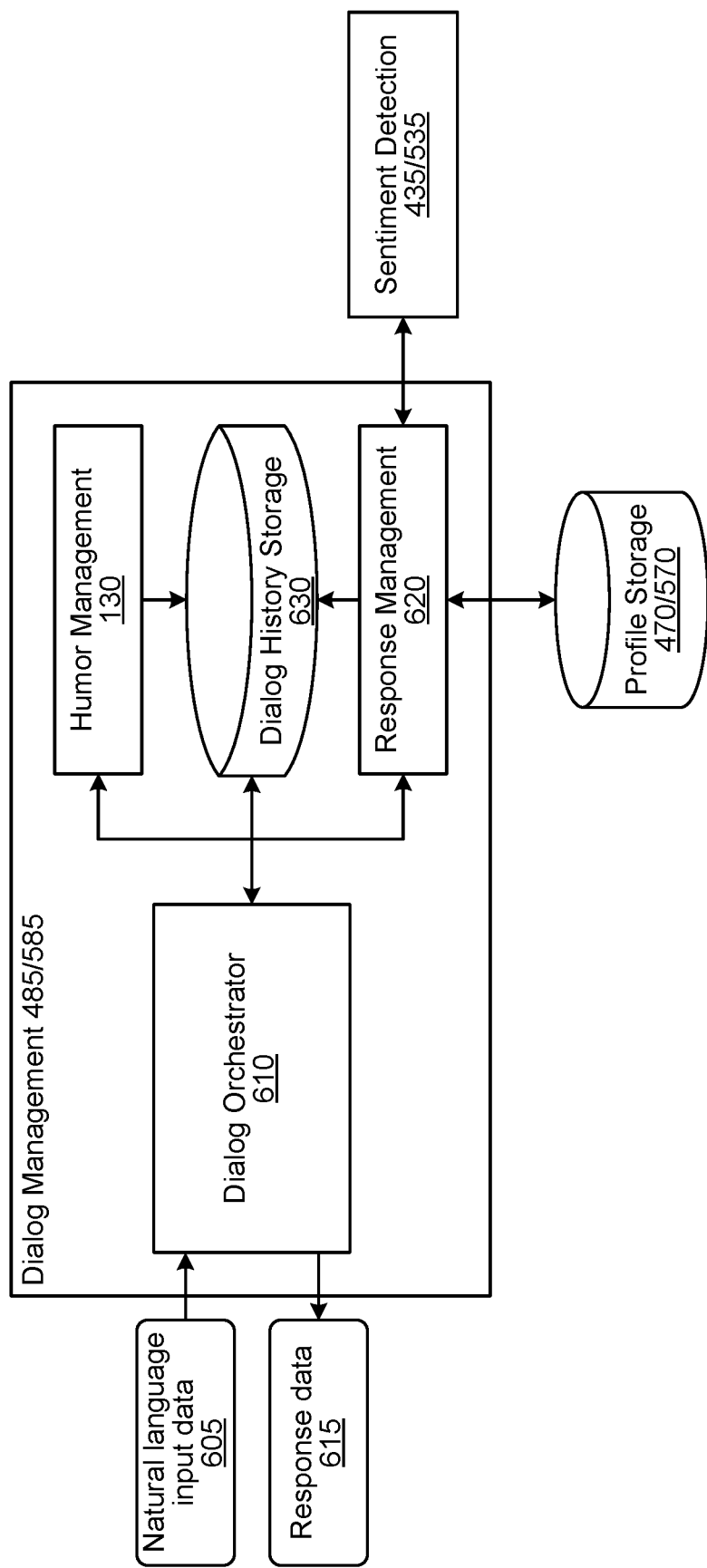
FIG. 6 shows an example implementation of a dialog management component, such as the dialog management components shown in FIGS. 4 and 5, according to embodiments of the present disclosure.

FIG. 6 shows an example implementation of the dialog management component 485/585, which may be implemented by the system 120 (as shown in FIG. 4), by the device 110 (as shown in FIG. 5), or elsewhere in the system 100. In some embodiments, the dialog management component 485/585 may be implemented as a skill 425/525, or as a component of a skill 425/525. As shown in FIG. 6, in some implementations, in addition to the humor management component 130 (described above), the dialog management component 485/585 may include a dialog orchestrator component 610, a response management component 620, and a dialog history storage 630.

The dialog orchestrator component 610 may be configured to receive natural language input data 605, e.g., data corresponding to a natural language input provided by the user 5. The natural language input data 605 may include, for example, ASR output data (e.g., data representing words) and/or NLU output data (e.g., data representing an intent, entity, command, etc.) corresponding to received audio data 411 generated in response to an utterance by the user 5. The dialog orchestrator component 610 may be configured to coordinate the transmission of data between components of the dialog management component 485/585. In some implementations, for example, the dialog orchestrator component 610 may selectively call one or more components of the dialog management component 485/585 based on a determined intent of the natural language input data 605. The response management component 620 may determine response data 615 that is to be sent to the device 110 or another component of the system 100.

For example, in some implementations, the response data 615 may cause the device 110 to output audio corresponding to the response data 615 (e.g., by processing the response data 615 with a TTS component 480/580), or to output text corresponding to a system-generated response, e.g., via a display of the device 110. In some implementations, the response data 615 may additionally or alternatively cause the device 110 to perform an operation (e.g., to begin playing music), or may cause another device to take a certain action (e.g., to cause a "smart light" to turn on or off). The response management component 620 may determine and/or generate such response data 615 in any of a number of ways. As but a few examples, the response management component 620 may (A) answer a question corresponding to the spoken natural language input data 605, e.g., by retrieving responsive data from a knowledgebase, (B) retrieve data from an information source (e.g., a weather application) to respond to a command (e.g., "tell me about today's weather"), (C) retrieve requested content (e.g., a song or story) from a datastore, (D) determine a command to provide to a home automation system (e.g., a command to turn on the living room lights), (E) initiate a skill 425/525 (e.g., to begin playing Jeopardy), (F) tell a joke about a particular topic in response to a command (e.g., "tell me a joke about chemistry," (G) output a pun relating to a particular subject in response to a command (e.g., "tell me a pun relating to lawyers"), etc.

At runtime, the system 120/device 110 may receive natural language input data 605 corresponding to a dialog. As used herein, a "dialog" may refer to an exchange of related natural language input data 605 and system-generated response data 615. A dialog may be goal-oriented, meaning the dialog is directed to the performance of a specific action (e.g., figuring out what music the system 100 should play). Receipt of natural language input data 605 and performance of a corresponding action (i.e., output of a system-generated response) may be referred to as a dialog "turn." A dialog identifier may be associated with multiple related turns corresponding to consecutive related natural language inputs and system responses. Each turn may be associated with a respective turn identifier. One natural language input may be considered related to a subsequent natural language input, thereby causing a single dialog identifier to be associated with both natural language inputs. A first natural language input may be considered related to a second (subsequent) natural language input based on, for example, a length of time between receipt of the first and second natural language inputs, a length of time between performance of a system-generated response to the first natural language input and receipt of the second natural language input, the similarity of the subject matter of the first and second natural language inputs, and/or the similarity of the subject matter of the second natural language input and the system-generated response to the first natural language input.

As disclosed above, the NLU component 460/560 may be configured to determine an intent of a natural language input. At runtime, the NLU component 460/560 may determine that a first natural input language corresponds to an intent associated with the dialog management component 485/585, e.g., a skill 425/525. In response to such a determination, first natural language input data 605 may be sent to the dialog management component 485/585, resulting in the dialog management component 485/585 becoming "in focus" for a dialog including the first natural language input data 605. The dialog orchestrator component 610 of the dialog management component 485/585 may send the first natural language input data 605 to the response management component 620 for processing to determine response data 615 to send to the device 110 or elsewhere. Thereafter, when a second natural language input is received, the system 120/device 110 may determine that the second natural language input corresponds to the same dialog as the first natural language input, and thus determine that the dialog management component 485/585 remains in focus for the dialog. Based on the dialog management component 485/585 being in focus, second natural language input data 605 corresponding to the second natural language input may not undergo NLU processing by the NLU component 460/560. Rather, the second natural language input data 605, e.g., including ASR output data corresponding to the second natural language input, may be sent to the dialog management component 485/585.

In the foregoing situation, an intent classifier of the response management component 620 may process the ASR output data to determine an intent of the second natural language input data 605. The intent classifier of the response management component 620 may be configured to determine one or more intents executable by the dialog management component 485/585. In some embodiments, the dialog management component 485/585 may, for example, be configured to engage the user 5 in a storytelling user experience that optionally includes question and answering functionality. In such embodiments, the intent classifier may be configured to determine intents such as a <RequestStory> intent indicating that natural language input data 605 request that a story be output; a <StoryNavigation> intent indicating that natural language input data 605 requests a different section (e.g., previous page, next page, etc.) of a book be output; a <QuestionAnswer> intent indicating that natural language input data 605 requests an answer to a question represented in the natural language input data 605; a <ChangeStory> intent indicating that natural language input data 605 requests a different story be output; and/or a <Conversation> intent indicating that natural language input data 605 provides information requested by the dialog management system 485/585 in order to perform an action.

The intent classifier of the response management component 620 may be configured using various techniques. In some embodiments, the intent classifier may implement a machine learning (ML) model(s). Various machine learning techniques may be used to train and operate ML models. A ML model may be trained and operated according to various ML techniques. Such techniques may include, for example, neural networks (such as deep neural networks and/or recurrent neural networks), inference engines, trained classifiers, etc. Examples of trained classifiers include Support Vector Machines (SVMs), neural networks, decision trees, Ada-Boost (short for "Adaptive Boosting") combined with decision trees, and random forests. Focusing on SVM as an example, SVM is a supervised learning model with associated learning algorithms that analyze data and recognize patterns in the data, and which are commonly used for classification and regression analysis. Given a set of training examples, each marked as belonging to one of two categories, an SVM training algorithm builds a model that assigns new examples into one category or the other, making it a non-probabilistic binary linear classifier. More complex SVM models may be built with the training set identifying more than two categories, with the SVM determining which category is most similar to input data. An SVM model may be mapped so that the examples of the separate categories are divided by clear gaps. New examples are then mapped into that same space and predicted to belong to a category based on which side of the gaps they fall on. Classifiers may issue a "score" indicating which category the data most closely matches. The score may provide an indication of how closely the data matches the category.

In order to apply the machine learning techniques, the machine learning processes themselves need to be trained. Training a machine learning component such as, in this case, one of the first or second models, requires establishing a "ground truth" for the training examples. In machine learning, the term "ground truth" refers to the accuracy of a training set's classification for supervised learning techniques. Various techniques may be used to train the models including backpropagation, statistical learning, supervised learning, semi-supervised learning, stochastic learning, or other known techniques.

At runtime, inputs to the intent classifier of the response management component 620 may include, for example, a dialog identifier of the present dialog, a user identifier (e.g., output by the user recognition component 495/595), the natural language input data 605, user recognition data, sentiment data, and/or dialog state data (e.g., representing the presently executing functionality of the dialog management component 485/585, such as storytelling or question and answering).

In some embodiments, the dialog management component 485/585 may not include an intent classifier. In such embodiments, even when the dialog management component 485/585 is in focus, the NLU component 460/560 may be used to determine an intent of a subsequently received natural language input, and the natural language input data 605 received by the dialog management component 485/585 in such circumstance may include NLU output data in addition to or instead of ASR output data.

In some embodiments, the dialog management component 485/585 may include a NER component (not illustrated). The NER component may process similarly to the NER component of the NLU component 460/560 described above. Such an NER component of the dialog management component 485/585 may be configured to determine entity types and values corresponding to the dialog management component 485/585, and not necessarily all entity types and values determinable by the NER component of the NLU component 460/560. In some embodiments, the NER component, of the dialog management component 485/585, may implement a ML model.

The dialog history storage 630 of the dialog management component 485/585 may store various data relating to one or more dialogs. For example, for a given dialog, the dialog history storage 630 may associate a dialog identifier with the natural language input data 605 of the dialog, the intent(s) determined for the natural language input(s) of the dialog, the natural language input data 605 received by the dialog management component 485/585, and the response data 615 sent to the device 110 or elsewhere as part of the dialog. The dialog history storage 630 may receive data from the dialog orchestrator component 610 and/or the response management component 620. Similarly, the intent classifier of the response management component 620 may use dialog history data, stored in the dialog history storage 630 for the one or more dialogs, to improve intent classification processing (i.e., to make it more likely that the intent determined by the intent classifier accurately represents the actual intent of the natural language input). Likewise, the humor management component 130 may use dialog history data, stored in the dialog history storage 630 for one or more dialogs, to determine whether a given dialog includes humorous content (e.g., by recognizing the presence of one or more puns in one or more sentences of the dialog) and/or to determine one or more keywords representing the current context of one or more dialogs for use in generating a pun that make sense in that context.

With respect to recognizing and/or inserting humor in a dialog, in some implementations, the humor recognizer 140 of the humor management component 130 may continuously monitor the text of one or more sentences of the dialog, such as by continuously feeding a set of tokens representing such text to the input of the pun explanation model 202 shown in FIG. 2A, together with the prefix that was used during the T5 model fine-tuning process, e.g., as described above in connection with FIG. 2C. The output of the pun classification model 204 of the humor recognizer 140 may then be provided to the response management component 620 for use in determining appropriate response data 615 when the output of the pun classification model 204 indicates that a pun has been recognized in the text of the dialog. For instance, as alluded to above, if the user 5 says something that either alone or together with previously output response data 615 is recognized as a pun by the humor recognizer 140, the response management component 620 may cause the device 110 to output "I see what you did there!" or some similar phrase, to output a giggling or laughing sound, etc. Further, as discussed in more detail below, in some implementations, the response management component 620 may evaluate various inputs to determine whether to request that the humor generator 150 generate a pun (e.g., to send to the device 110 as response data 615) that makes sense in the current context of the dialog. In some implementations, one of the inputs the response management component 620 may evaluate for that purpose may be the output of the humor recognizer 140. Such an evaluation may enable the response management component 620 to inject humor into a dialog at an appropriate time, as the recognition of a pun in the current dialog may indicate that the user 5 is in a playful or joking mood.

As noted above, the response management component 620 may determine appropriate responses to natural language inputs from the user 5. In some implementations, the response management component 620 may determine, based on the current contextual state of the system 100, that it would be a good time to cause the device 110 to output a humorous statement, such as a pun. In such a scenario, the response management component 620 may send a request to the humor management component 130 to generate a pun that can be output as response data 615. As noted above, to make such a determination, the response management component 620 may receive inputs from various sources, including the output of humor recognizer 140 of the humor management component 130. In some implementations, the response management component 620 may additionally or alternatively interact with the sentiment detection component 435/535 to determine the current sentiment of the user 5, such as whether the user is happy, smiling, laughing, etc., or perhaps whether the user 5 is sad, frowning, or crying, and could perhaps use some cheering up. The determination by the response management component 620 of whether to request the generation of a pun by the humor generator 150 may further be based at least in part on the determined sentiment of the user 5. Further, in some implementations, the response management component 620 may additionally or alternatively query the profile storage 470/570 for profile data corresponding to the user 5, such as data indicating whether the user likes or dislikes receiving humorous responses from the system 100. The determination by the response management component 620 of whether to request the generation of a pun by the humor generator 150 may further be based at least in part on such profile data.

In some implementations, the profile data stored in the profile storage 470/570 may additionally include information such as the age of the user 5, a geographic location of the user 5 or the device 110, one or more languages spoken by the user 5, one or more joke type preferences of the user 5, one or more subject matter preference (e.g., cats, dogs, fishing, etc.) of the user 5. In such implementations, the response management component 620 may send such additional information to the humor generator 150, or the humor generator 150 may separately access such additional information, and the humor generator 150 may use it to generate humorous text, e.g., a pun, that is more closely related to the user's preferences and/or demographic data. In some implementations, for instance, one or more items of such preference data may be used to determine one or more of the keywords that are fed to the pun word classification model 304 shown in FIG. 3A.

As discussed above in connection with FIG. 3A, the humor generator 150 of the humor management component 130 may include a keyword extractor 302 that is configured to identify one or more keywords that are to be fed to the pun word classification model 304. In some implementations, in response to receiving a request to generate a pun, the humor generator 150 may evaluate the content of the dialog history storage 630 to identify one or more sentences corresponding to one or more recent turns of one or more dialogs with the user 5. The humor generator 150 may then use a keyword extraction algorithm, such as the RAKE algorithm, to extract keywords from such sentences. In some implementations, one or more keywords corresponding to one or more user preferences, may also be identified and used to supplement the keyword(s) extracted from the dialog turns. As an example, if the profile of the user 5 indicates that the user has an affinity for cats, the word "cat" can be at least occasionally be inserted into the list of keyword(s) extracted from content of the dialog history storage 630.

No matter how the keyword(s) are determined, as described above in connection with FIG. 3A, the identified keyword(s) maybe fed to the pun classification model 304, as well as the pun generation model 308, to initiate the generation of a pun by the pun generation model 308, provided the pun classification model 304 is able to identify a pun word pair that is sufficiently contextually related to the identified keyword(s), e.g., by having a confidence value that exceeds a threshold.

Although not illustrated in FIG. 3A, it should be appreciated that, in some implementations, the pun word selector 306 may further have access to a storage medium that stores data representing the senses of the various pun words and alternate words the pun word classification model 304 is trained to classify. In such implementations, the pun word selector 306 may retrieve such sense information, e.g., from such storage medium, and provide that sense information to the pun generation model 308, together with an identified pun word pair and the determined keyword(s), to enable the pun generation model 308 to use that sense information to generate an even more suitable, context-situated pun. In other implementations, pun word/alternate word sense information may not be used when generating puns, and the pun word selector 306 may send only a selected pun word pair to the pun generation model 308 for use in generating a pun that make sense in the context of determined keyword(s).

Figure 7:
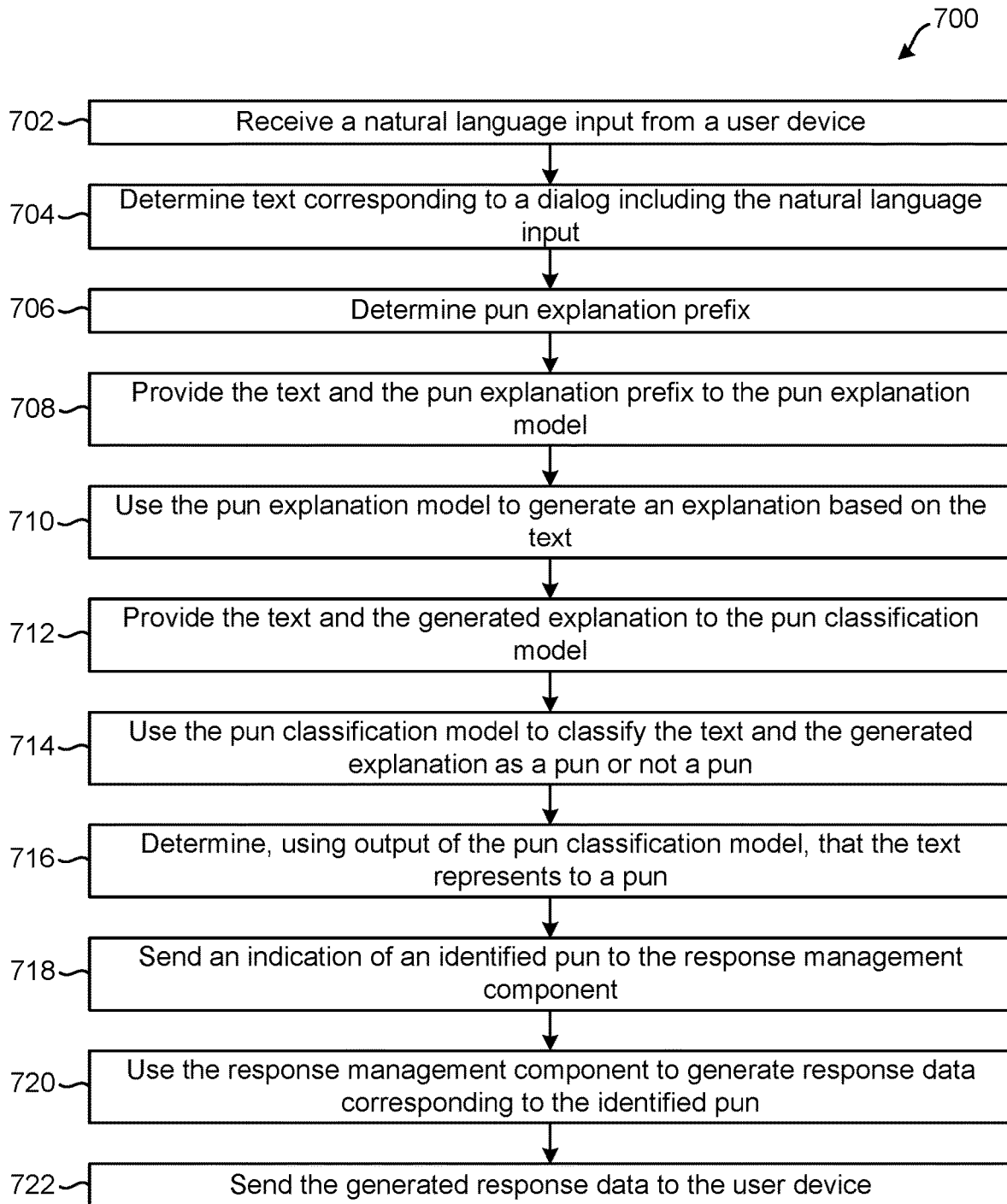
FIG. 7 shows an example process that may be performed by one or more components of the dialog management component shown in FIG. 6 to recognize and respond to humor during a dialog.

FIG. 7 shows an example process 700 that may be performed by one or more components of the dialog management component 485/585 to recognize and respond to humor during a dialog. In some implementations, for example, the device 110 (described above) may be a voice-controlled device, such an Amazon Echo, and the user 5 may speak one or utterances in a vicinity of the device 110 during a dialog that is being managed by the dialog management component 485/585. In other implementation, the device 110 may determine text corresponding to a dialog in other ways, such as in response to the user 5 typing on a keyboard of the device 110.

As shown in FIG. 7, at a step 702 of the process 700, the dialog management component 485/585 may receive a natural language input from a user device 110. For example, as shown in FIG. 6, natural language input data 605 representing an utterance (e.g., ASR data) by the user 5 may be received by the dialog orchestrator component 610.

At a step 704 of the process 700, the dialog management component 485/585 may determine text corresponding to a dialog including the natural language input received at the step 702. In some implementations, for example, the humor recognizer 140 of the humor management component 130 may determine the text of one or more sentences of a dialog represented by data stored in dialog history storage 630. Such text may include a textual representation of the natural language input received at the step 702, and may also include a textual representation of one or more responses (e.g., corresponding to response data 615) sent to the device 110 before and/or after receipt of the natural language input.

At a step 706 of the process 700, the humor recognizer 140 may determine a pun explanation prefix that can be provided to the pun explanation model 202 (see FIG. 2A), together with the text determined at the step 704, to prompt the pun explanation model 202 to generate an explanation concerning the text. The pun explanation prefix determined at the step 706 may be the same prefix that was used to fine-tune a BERT model to generate the pun explanation model 202, as described above in connection with FIG. 2C.

At a step 708 of the process 700, the humor recognizer 140 may provide the text determined at the step 704 and the prefix determined at the step 706 to the pun explanation model 202.

At a step 710 of the process 700, the pun explanation model 202 may process the text and prefix to generate an explanation for the text.

At a step 712 of the process 700, the humor recognizer 140 may provide the text (determined at the step 704) and the explanation (generated at the step 710) to the pun classification model 204 (see FIG. 2A).

At a step 714 of the process 700, the pun classification model 204 may process the text and the generated explanation to determine whether or not the text represents a pun. As shown in FIG. 2A, for example, in some implementations, the pun classification model 204 may output a "pun indicator." In some implementations, the pun indicator may be a Boolean value indicating whether or not the text represents a pun. In other implementation, the pun indicator may additionally or alternatively represent confidence value indicating a level of confidence that the text represents a pun.

At a step 716 of the process 700, the humor recognizer 140 may use the output of the pun classification model 204 to determine that the text represents a pun, such as by determining that a Boolean output has a certain value, e.g., "1," or by determining that an output confidence value exceeds a threshold.

At a step 718 of the process 700, in response to determining that the text represents a pun, the humor recognizer 140 may send an indication of an identified pun to the response management component 620 (see FIG. 6).

At a step 720 of the process 700, the response management component 620 may generate response data 615 corresponding to the pun. For example, as noted above, in response to the humor recognizer 140 notifying the response management component 620 that something the user said, either alone or together with an output provided by the device 110, represents a pun, the 620 may generate response data 615 to cause the device 110 to output "I see what you did there!," to output a laughing or giggling sound, etc.

At a step 722 of the process 700, the response management component 620 may send the generated response data 615 to the device 110, thus causing the device 110 to output a corresponding response. In some implementations, the generated response data 615 may comprise audio data that causes the device 110 to output an audio response. In other implementations, the generated response data 615 may be text data and a TTS component 480/580 may be used to convert that text data into audio data that can be sent to the device 110. In still other implementations, the response management component 620 may additionally or alternatively send generated text data to the device 110 for display on a display screen of the device 110.

Figure 8:
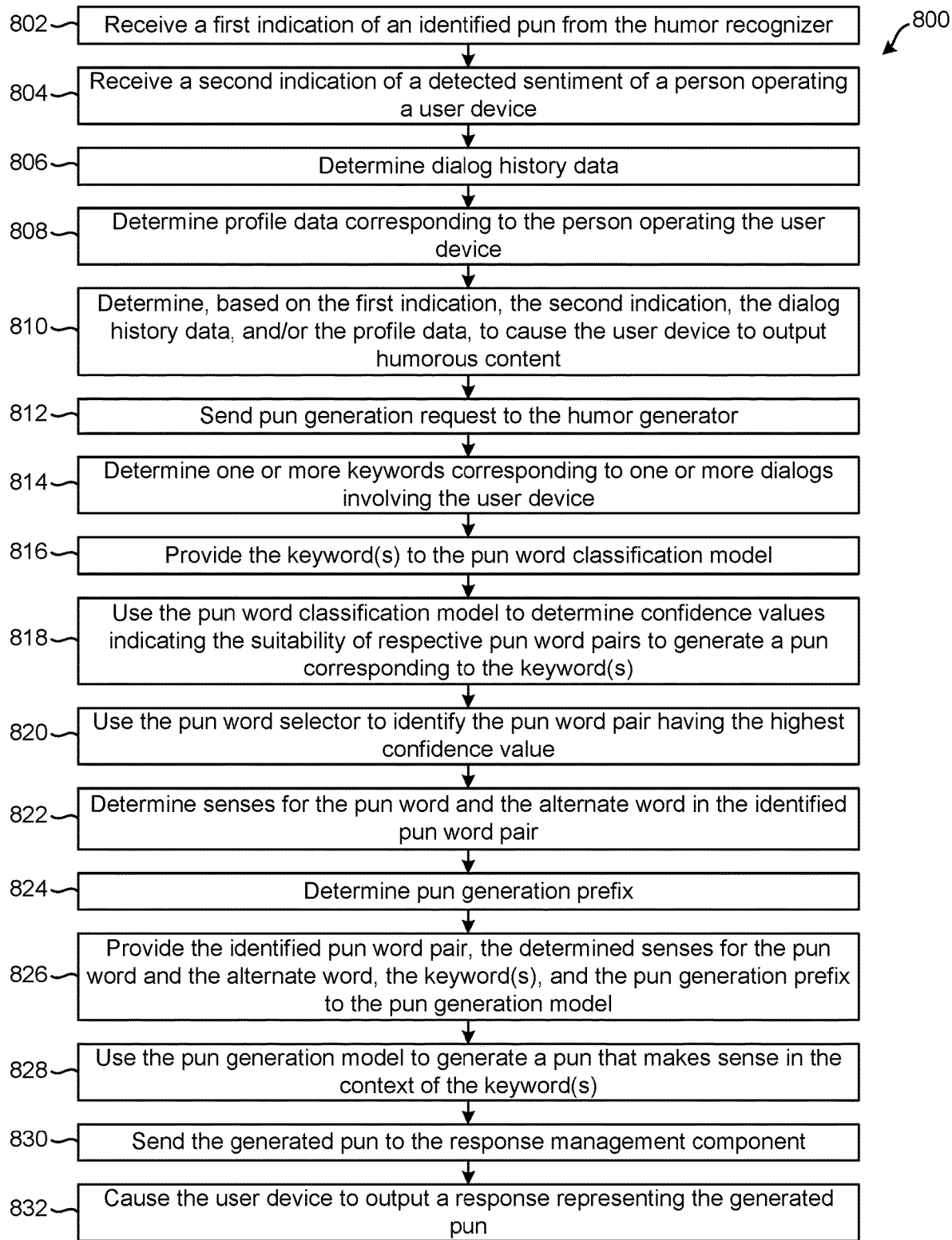
FIG. 8 shows an example process that may be performed by one or more components of the dialog management component shown in FIG. 6 to inject context-based humor into a dialog at an appropriate time.

FIG. 8 shows an example process 800 that may be performed by one or more components of the dialog management component 485/585 to inject context-based humor into a dialog at an appropriate time. As noted above, in some implementations, the response management component 620 (shown in FIG. 6) may be responsible for determining, based on one or more inputs, whether to send a request to the humor generator 150 to generate a pun that makes sense in the current context of the dialog. Examples of inputs that maybe evaluated by the response management component 620 for that purpose are reflected in the steps 802, 804, 806 and 808 of the process 800. As shown in FIG. 8, per the step 802, the response management component 620 may receive a first indication of an identified pun (e.g., an output of the pun classification model 204 shown in FIG. 2A) from the humor recognizer 140. Per the step 804, the response management component 620 may additionally or alternatively receive a second indication of a detected sentiment of a user 5 operating the device 110, such as whether the person is happy, smiling, or laughing. Per the step 806, the response management component 620 may additionally or alternatively receive dialog history data from the dialog history storage 630, such as the text of one or more recent dialogs with the user 5 of the device 110. Per the step 808, the response management component 620 may additionally or alternatively receive profile data corresponding to the user 5 of the device 110.

At a step 810 of the process 800, the response management component 620 may determine, based on one or more of the foregoing inputs (or otherwise), to cause the device 110 to output humorous content. For example, if one or more of such inputs indicate that the user 5 is likely in a jovial mood, the response management component 620 may determine that it is an appropriate time to cause the device 110 to output audio that is intended to make the user 5 laugh.

In response to determining to cause the device 110 to output humorous content (per the step 810), the response management component 620 may (per a step 812) send a request to the humor generator 150 to generate a pun that makes sense given the current context of the dialog with the user 5.

At a step 814 of the process 800, the keyword extractor 302 of the humor generator 150 (see FIG. 3A) may determine one or more keywords corresponding to one or more dialogs involving the user 5. For example, as noted above, in some implementations, the keyword extractor 302 may employ the rapid automatic keyword extraction (RAKE) algorithm to extract one or more keywords from such one or more recent utterances spoken by the user 5 and/or one or more recent responses provided by the device 110 to the user 5.

At a step 816 of the process 800 the keyword extractor 302 may provide the extracted keyword(s) to the pun word classification model 304.

At a step 818 of the process 800, the pun word classification model 304 may process the input keyword(s) to determine confidence values indicating the suitability of respective pun words pair to generate a pun corresponding to such keyword(s). If none of the confidence values exceeds a threshold value, the humor generator 150 may send a message to the response management component 620 indicating that a suitable pun cannot be generated given the current contextual circumstances.

At a step 820 of the process 800, if at least one confidence value determined by the pun word classification model 304 exceeds the threshold value, the pun word selector 306 may evaluate the confidence values output by the pun word classification model 304 to identify the pun word pair having the highest confidence value.

At a step 822 of the process 800, the pun word selector 306 may (optionally) determine senses (i.e., meanings) for the pun word and the alternate word in the pun word paid identified per the step 820.

At a step 824 of the process 800, the humor generator 150 may determine a prefix to use to instruct the pun generation model 308 to generate a pun based on its various inputs (e.g., the same prefix that was used to fine-tune the pun generation model 308 as described in connection with FIG. 3D).

At a step 826 of the process 800, the humor generator 150 may provide the pun word pair identified at the step 820 and (optionally) the senses identified at the step 822 to the pun generation model 308, together with the keyword(s) determined at the step 814 and the prefix determined at the step 824 to the pun generation model 308.

At a step 828 of the process 800, the pun generation model 308 may, based on the foregoing inputs, generate a pun that makes sense in the context of the keyword(s) determined at the step 814.

At a step 830 of the process 800, the pun word selector 306 of the humor generator 150 may send the generated pun to the response management component 620. Alternatively, as noted previously, in some circumstances the humor generator 150 may instead send to the response management component 620 an indication that the humor generator 150 was unable to generate a pun, e.g., when none of the confidence values determined by the pun word classification model 304 exceeded the threshold value.

At a step 832 of the process 800, in the event that the response management component 620 receives a generated pun from the humor generator 150, the response management component 620 may cause the device 110 to output a response representing the generated pun, such as by sending response data 615 representing the generated pun to the device 110, or perhaps by sending response data 615 representing the generated pun a TTS components 480/580 to convert the response data 615 into audio data to send to the device 110 for output as an audio response. If, on the other hand, the response management component 620 received from the humor generator 150 and indication that a suitable pun could not be generated, the response management component 620 may instead determine not to cause the device 110 to output humorous content given the current contextual circumstances.

Figure 9:
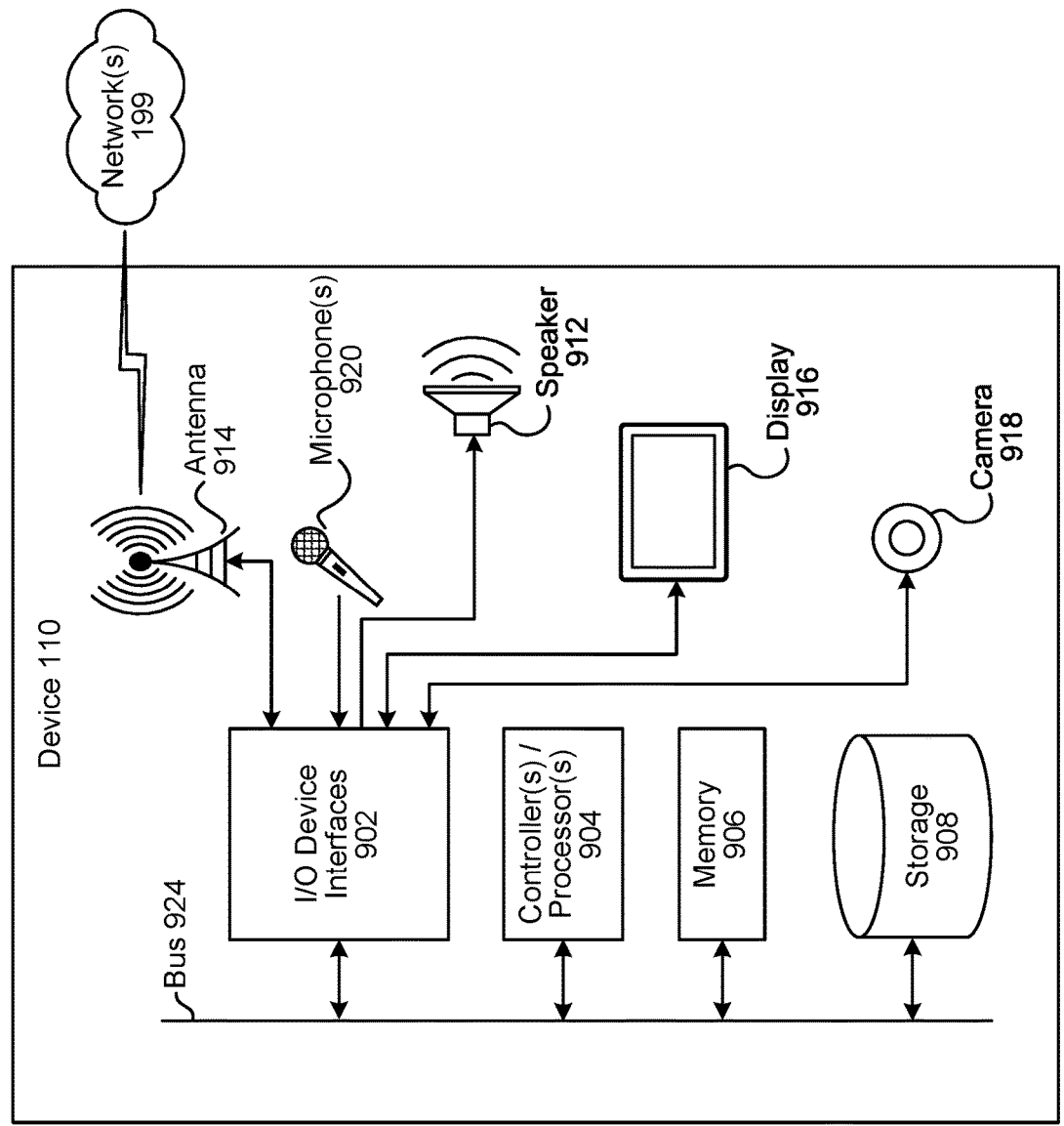
FIG. 9 is a block diagram conceptually illustrating example components of a device, according to some embodiments of the present disclosure.
Figure 10:
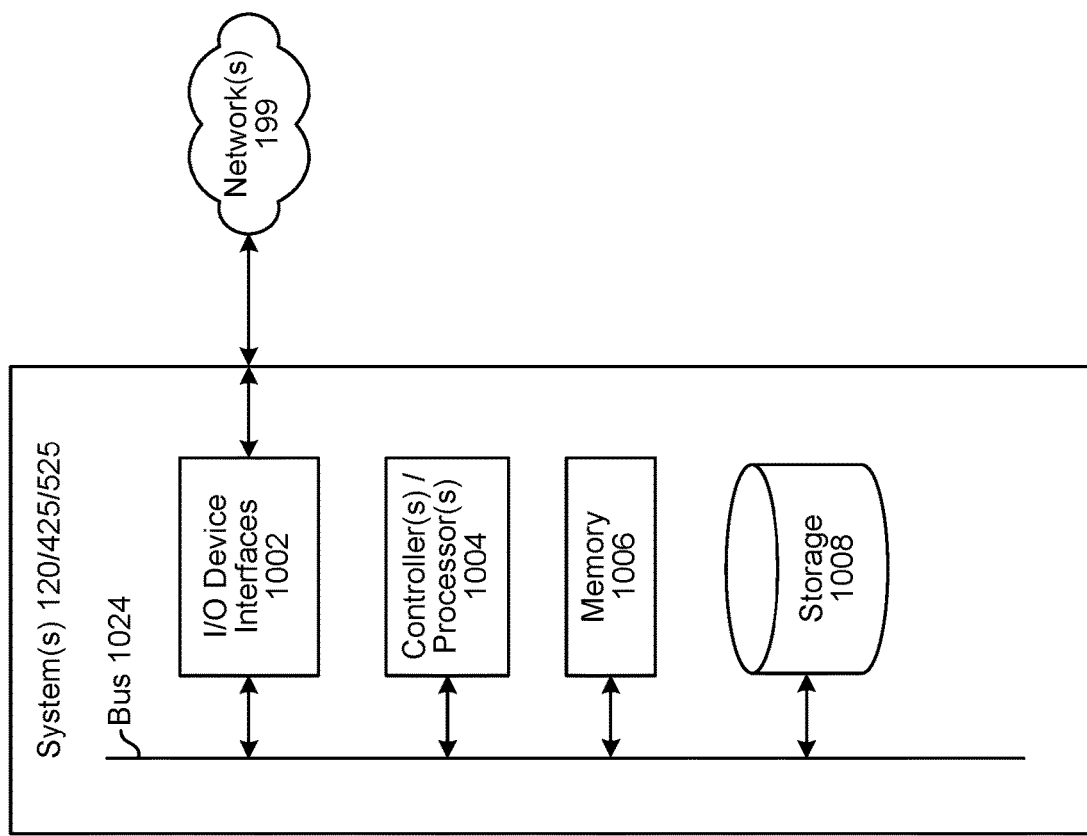
FIG. 10 is a block diagram conceptually illustrating example components of a system, according to some embodiments of the present disclosure.

FIG. 9 is a block diagram conceptually illustrating a device 110 that may be used with the system 120. FIG. 10 is a block diagram conceptually illustrating example components of a remote device, such as the system 120 or a skill 425/525. A system (120/425/525) may include one or more servers. A "server" as used herein may refer to a traditional server as understood in a server/client computing structure but may also refer to a number of different computing components that may assist with the operations discussed herein. For example, a server may include one or more physical computing components (such as a rack server) that are connected to other devices/components either physically and/or over a network and is capable of performing computing operations. A server may also include one or more virtual machines that emulates a computer system and is run on one or across multiple devices. A server may also include other combinations of hardware, software, firmware, or the like to perform operations discussed herein. The system (120/425/525) may be configured to operate using one or more of a client-server model, a computer bureau model, grid computing techniques, fog computing techniques, mainframe techniques, utility computing techniques, a peer-to-peer model, sandbox techniques, or other computing techniques.

Multiple systems (120/425/525) may be included in the system 100 of the present disclosure, such as one or more systems 120 and/or one or more skills 425/525. In operation, each of these systems may include computer-readable and computer-executable instructions that reside on the respective device (120/425/525), as will be discussed further below.

Each of these devices (110/120/425/525) may include one or more controllers/processors (904/1004), which may each include a central processing unit (CPU) for processing data and computer-readable instructions, and a memory (906/1006) for storing data and instructions of the respective device. The memories (906/1006) may individually include volatile random access memory (RAM), non-volatile read only memory (ROM), non-volatile magnetoresistive memory (MRAM), and/or other types of memory. Each device (110/120/425/525) may also include a data storage component (908/1008) for storing data and controller/processor-executable instructions. Each data storage component (908/1008) may individually include one or more non-volatile storage types such as magnetic storage, optical storage, solid-state storage, etc. Each device (110/120/425/525) may also be connected to removable or external non-volatile memory and/or storage (such as a removable memory card, memory key drive, networked storage, etc.) through respective input/output device interfaces (902/1002).

Computer instructions for operating each device (110/120/425/525) and its various components may be executed by the respective device's controller(s)/processor(s) (904/1004), using the memory (906/1006) as temporary "working" storage at runtime. A device's computer instructions may be stored in a non-transitory manner in non-volatile memory (906/1006), storage (908/1008), or an external device(s). Alternatively, some or all of the executable instructions may be embedded in hardware or firmware on the respective device in addition to or instead of software.

Each device (110/120/425/525) includes input/output device interfaces (902/1002). A variety of components may be connected through the input/output device interfaces (902/1002), as will be discussed further below. Additionally, each device (110/120/425) may include an address/data bus (1624/1024) for conveying data among components of the respective device. Each component within a device (110/120/425/525) may also be directly connected to other components in addition to (or instead of) being connected to other components across the bus (1624/1024).

Referring to FIG. 9, the device 110 may include input/output device interfaces 902 that connect to a variety of components such as an audio output component such as a speaker 912, a wired headset or a wireless headset (not illustrated), or other component capable of outputting audio. The device 110 may also include an audio capture component. The audio capture component may be, for example, a microphone 920 or array of microphones, a wired headset or a wireless headset (not illustrated), etc. If an array of microphones is included, approximate distance to a sound's point of origin may be determined by acoustic localization based on time and amplitude differences between sounds captured by different microphones of the array. The device 110 may additionally include a display 916 for displaying content. The device 110 may further include a camera 918.

Via antenna(s) 914, the input/output device interfaces 902 may connect to one or more networks 199 via a wireless local area network (WLAN) (such as Wi-Fi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Through the network(s) 199, the system may be distributed across a networked environment. The I/O device interface (902/1002) may also include communication components that allow data to be exchanged between devices such as different physical servers in a collection of servers or other components.

The components of the device 110, the system 120, and/or the skill 425/525 may include their own dedicated processors, memory, and/or storage. Alternatively, one or more of the components of the device 110, the system 120, and/or the skill 425/525 may utilize the I/O interfaces (902/1002), processor(s) (904/1004), memory (906/1006), and/or storage (908/1008) of the device 110, the system 120, or the skill 425/525, respectively. Thus, the ASR component 450/560 may have its own I/O interface(s), processor(s), memory, and/or storage; the NLU component 460/560 may have its own I/O interface(s), processor(s), memory, and/or storage; and so forth for the various components discussed herein.

As noted above, multiple devices may be employed in a single system. In such a multi-device system, each of the devices may include different components for performing different aspects of the system's processing. The multiple devices may include overlapping components. The components of the device 110, the system 120, and the skill 425/525, as described herein, are illustrative, and may be located as a stand-alone device or may be included, in whole or in part, as a component of a larger device or system.

Figure 11:
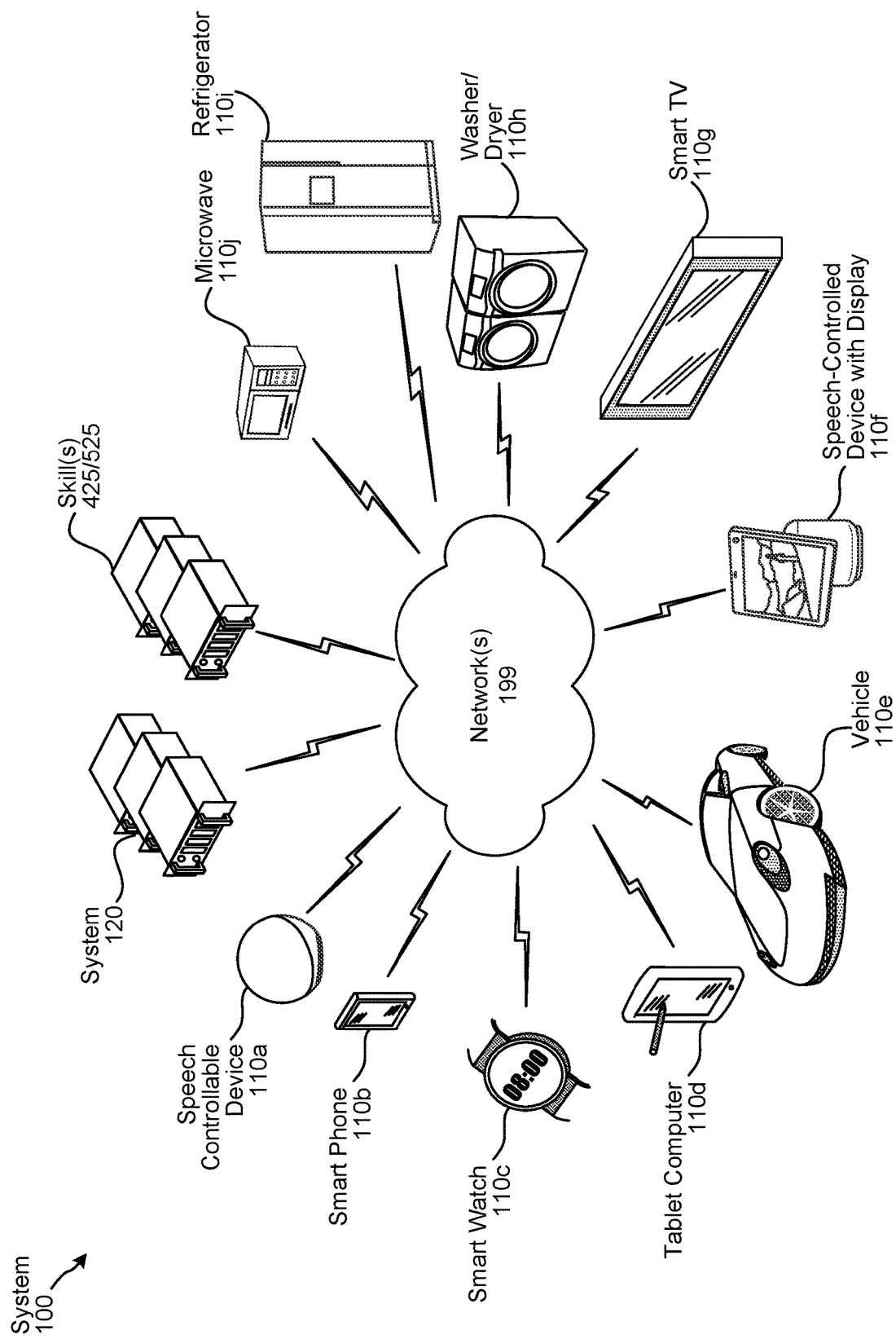
FIG. 11 illustrates an example of a computer network for use with the overall system, according to some embodiments of the present disclosure.

As illustrated in FIG. 11, multiple devices (110a-110j, 120, 425/525) may contain components of the system and the devices may be connected over a network(s) 199. The network(s) 199 may include a local or private network or may include a wide network such as the Internet. Devices may be connected to the network(s) 199 through either wired or wireless connections. For example, a speech-controllable device 110a, a smart phone 110b, a smart watch 110c, a tablet computer 110d, a vehicle 110e, a speech-controllable display device 110f, a smart television 110g, a washer/dryer 110h, a refrigerator 110i, and/or a microwave 110j may be connected to the network(s) 199 through a wireless service provider, over a Wi-Fi or cellular network connection, or the like. Other devices are included as network-connected support devices, such as the system 120, the skill 425/525, and/or others. The support devices may connect to the network(s) 199 through a wired connection or wireless connection.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of system may be implemented as in firmware or hardware, such as an acoustic front end (AFE), which comprises, among other things, analog and/or digital filters (e.g., filters configured as firmware to a digital signal processor (DSP)).

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method, comprising:
    receiving, from a first device, first audio data representing an utterance corresponding to a dialog between the first device and a system;
    performing speech processing using the first audio data to determine first data representing first text corresponding to the utterance;
    sending, to a dialog management component, the first data;
    processing the first data using a text-to-text transfer transformer (T5) model configured to generate output based on input such that the output represents an explanation as to why the input is humorous;

receiving, from the T5 model, second data representing an explanation as to why the first text is humorous;

processing the first data and the second data using a bidirectional encoder representations from transformers (BERT) model configured to classify input text as corresponding to a pun;

determining that the BERT model classified the first data and the second data as corresponding to a pun;

sending an indication of the pun to the dialog management component; and determining, by the dialog management component, and based at least in part on the first data and the indication of the pun, output data responsive to the utterance.

2. The computer-implemented method of claim 1, further comprising, prior to receiving the first audio data:

training the T5 model using training data including at least third data representing a first text prefix corresponding to generation of pun explanations, fourth data representing a first pun, and fifth data representing a first explanation of the first pun, with the fifth data being used to supervise the training.

3. The computer-implemented method of claim 1, further comprising, prior to receiving the first audio data:

training the BERT model using training data including at least third data representing second text, fourth data representing an explanation of the second text, and a first value indicating that the second text represents a pun, with the first value being used to supervise the training.

4. The computer-implemented method of claim 1, further comprising:

receiving, from the dialog management component, dialog data representing at least one user input and at least one system response corresponding to the dialog;

wherein the output data is determined further based at least in part on the dialog data.

5. A computer-implemented method, comprising:

receiving first data representing first text of a sentence including a pun;

processing the first data using a first machine learning model to generate second data representing an explanation as to why the sentence includes a pun, wherein the first machine learning model is configured using training data including at least third data representing a first text prefix corresponding to generation of pun explanations, fourth data representing a first pun, and fifth data representing a first explanation of the first pun; and causing a first device to take at least a first action based at least in part on the second data.

6. The computer-implemented method of claim 5, wherein the first machine learning model comprises a text-to-text transfer transformer model.

7. The computer-implemented method of claim 6, further comprising:

training the text-to-text transfer transformer model using the training data, wherein the fifth data is used to supervise the training.

8. The computer-implemented method of claim 5, wherein:

the first machine learning model is configured to generate output text based on input text such that the output text represents an explanation as to why the input text includes a pun.

9. A computer-implemented method, comprising:

receiving first data representing first text of a sentence including a pun;

processing the first data using a first machine learning model to generate second data representing an explanation as to why the sentence includes a pun;

processing the first data and the second data using a second machine learning model configured to generate an output value based on input text such that the output value indicates whether the input text correspond to a pun;

receiving, from the second machine learning model, a first value indicating that the first data and the second data correspond to a pun; and causing a first device to take at least a first action based at least in part on the first value.

10. The computer-implemented method of claim 9, wherein the second machine learning model comprises a bidirectional encoder representations from transformers (BERT) model configured to classify the input text as corresponding to a pun or not corresponding to a pun.

11. The computer-implemented method of claim 10, wherein the BERT model is configured using training data including at least third data representing second text, fourth data representing an explanation of the second text, and a first value indicating that the second text represents a pun.

12. The computer-implemented method of claim 11, further comprising:

training the BERT model using the training data, wherein the first value is used to supervise the training.

13. The computer-implemented method of claim 9, further comprising:

receiving, by a dialog component, a first communication corresponding to the first text;

determining the first data based on the first communication;

generating, by the dialog component, a response recognizing that the first communication corresponded to a pun; and sending a second communication corresponding to the response to the first device to cause the first device to output a representation of the response.

14. The computer-implemented method of claim 9, wherein the first machine learning model is configured using training data including at least third data representing a first text prefix corresponding to generation of pun explanations, fourth data representing a first pun, and fifth data representing a first explanation of the first pun.

15. A system, comprising:

at least one processor; and at least one memory comprising instructions that, when executed by the at least one processor, cause the system to:

receive first data representing first text of a sentence including a pun;

process the first data using a first machine learning model including a neural network configured to generate second data representing an explanation as to why the sentence includes a pun, wherein the first machine learning model is configured using training data including at least third data representing a first text prefix corresponding to generation of pun explanations, fourth data representing a first pun, and fifth data representing a first explanation of the first pun; and cause a first device to take at least a first action based at least in part on the second data.

16. The system of claim 15, wherein the first machine learning model is configured to generate output text based on input text such that the output text represents an explanation as to why the input text includes a pun.

17. A system, comprising:
at least one processor; and
at least one memory comprising instructions that, when executed by the at least one processor, cause the system to:
receive first data representing first text of a sentence including a pun;
process the first data using a first machine learning model including a neural network configured to generate second data representing an explanation as to why the sentence includes a pun;
process the first data and the second data using a second machine learning model configured to generate an output value based on input text such that the output value indicates whether the input text correspond to a pun;
receive, from the second machine learning model, a first value indicating that the first data and the second data correspond to a pun; and
cause a first device to take at least a first action based at least in part on the first value.

18. The system of claim 17, wherein the second machine learning model comprises a bidirectional encoder representations from transformers (BERT) model configured to classify the input text as corresponding to a pun or not corresponding to a pun.

19. The system of claim 18, wherein the BERT model is configured using training data including at least third data representing second text, fourth data representing an explanation of the second text, and a first value indicating that the second text represents a pun.

20. The system of claim 19, wherein the at least one memory further comprises additional instructions that, when executed by the at least one processor, cause the system to:
train the BERT model using the training data, wherein the first value is used to supervise the training.

21. The system of claim 17, wherein the at least one memory further comprises additional instructions that, when executed by the at least one processor, cause the system to:
receive, by a dialog component, a first communication corresponding to the first text;
determine the first data based on the first communication;
generate, by the dialog component, a response recognizing that the first communication corresponded to a pun; and
send a second communication corresponding to the response to the first device to cause the first device to output a representation of the response.

22. The system of claim 17, wherein the first machine learning model is configured using training data including at least third data representing a first text prefix corresponding to generation of pun explanations, fourth data representing a first pun, and fifth data representing a first explanation of the first pun.

23. The system of claim 22, wherein the first machine learning model comprises a text-to-text transfer transformer model.

24. The system of claim 23, wherein the at least one memory further comprises additional instructions that, when executed by the at least one processor, cause the system to:
train the text-to-text transfer transformer model using the training data, wherein the fifth data is used to supervise the training.

* * * * *